United States Patent
Lee et al.

(10) Patent No.: US 11,292,863 B2
(45) Date of Patent: Apr. 5, 2022

(54) POLYOLEFIN-POLYSTYRENE MULTI-BLOCK COPOLYMER, ORGANOZINC COMPOUND FOR PREPARING SAME, AND METHOD FOR PREPARING POLYOLEFIN-POLYSTYRENE MULTI-BLOCK COPOLYMER

(71) Applicant: LG Chem, Ltd., Seoul (KR)

(72) Inventors: Bun Yeoul Lee, Suwon-si (KR); Seung Soo Park, Suwon-si (KR); Chung Sol Kim, Seongnam-si (KR); Hyun Mo Lee, Suwon-si (KR); Sung Dong Kim, Suwon-si (KR)

(73) Assignee: LG Chem, Ltd.

( * ) Notice: Subject to any disclaimer, the term of this patent is extended or adjusted under 35 U.S.C. 154(b) by 285 days.

(21) Appl. No.: 16/497,655

(22) PCT Filed: Feb. 14, 2018

(86) PCT No.: PCT/KR2018/001974
§ 371 (c)(1),
(2) Date: Sep. 25, 2019

(87) PCT Pub. No.: WO2018/182174
PCT Pub. Date: Oct. 4, 2018

(65) Prior Publication Data
US 2020/0031978 A1     Jan. 30, 2020

(30) Foreign Application Priority Data

Mar. 31, 2017 (KR) .................. 10-2017-0042191
Jul. 24, 2017 (KR) .................. 10-2017-0093822
Aug. 17, 2017 (KR) .................. 10-2017-0104226

(51) Int. Cl.
$C08F\ 297/02$ (2006.01)
$C07F\ 3/06$ (2006.01)
$C08F\ 297/08$ (2006.01)

(52) U.S. Cl.
CPC .............. $C08F\ 297/02$ (2013.01); $C07F\ 3/06$ (2013.01); $C08F\ 297/086$ (2013.01)

(58) Field of Classification Search
CPC .. C08F 297/00; C08F 297/083; C08F 297/02; C08F 297/086; C08F 295/00; C07F 3/06; C07F 19/00
See application file for complete search history.

(56) References Cited

U.S. PATENT DOCUMENTS 4,480,075 A    10/1984   Willis
5,777,031 A *   7/1998   Djiauw .................. C08L 53/02
                                                        525/98
(Continued)

FOREIGN PATENT DOCUMENTS

JP      560020918 A    2/1985
JP    2000514122 A   10/2000
(Continued)

OTHER PUBLICATIONS

International Search Report for Application No. PCT/KR2018/001974, dated Jul. 20, 2018.
(Continued)

*Primary Examiner* — Mark S Kaucher
(74) *Attorney, Agent, or Firm* — Lerner, David, Littenberg, Krumholz & Mentlik, LLP

(57) ABSTRACT

The present invention relates to a polyolefin-polystyrene multi-block copolymer having a structure comprising a polyolefin block and polystyrene blocks bonded to both ends of the polyolefin block, to an organozinc compound for (Continued)

preparing the same, and a method for preparing the polyolefin-polystyrene multi-block copolymer.

20 Claims, 9 Drawing Sheets

(56) References Cited

U.S. PATENT DOCUMENTS

| | | | |
|---|---|---|---|
| 6,630,532 B1 * | 10/2003 | Eiden | C08K 5/01 524/434 |
| 2015/0011447 A1 | 1/2015 | Waterson et al. | |
| 2015/0031835 A1 * | 1/2015 | Lo | B01J 23/6567 525/98 |
| 2018/0030195 A1 | 2/2018 | Oshita et al. | |

FOREIGN PATENT DOCUMENTS

| | | |
|---|---|---|
| JP | 2003509564 A | 3/2003 |
| JP | 2014015613 A | 1/2014 |
| JP | 2017057419 A | 3/2017 |
| JP | 2018505945 A | 3/2018 |
| WO | 2016129818 A1 | 8/2016 |

OTHER PUBLICATIONS

Jong Yeob Jeon et al., Synthesis of Polyolefin-block-polystyrene Through Sequential Coordination and Anionic Polymerizations, Journal of Polymer Science Part A: Polymer Chemistry, Jun. 27, 2016, vol. 54, No. 19, pp. 3110-3118.

Martin van Meurs et al., Polyethylene Chain Growth on Zinc Catalyzed by Olefin Polymerization Catalysts: A Comparative Investigation of Highly Active Catalyst Systems across the Transition Series, Journal of the American Chemical Society, Jun. 18, 2005, vol. 127, pp. 9913-9923.

Zhongyang Wang et al., Polystyrene-Block-Poly(ethylene-ran-butylene)-Block-Polystyrene Triblock Copolymer Separators for a Vandium-Cerium Redox Flow Battery, Journal of the Electrochemical Society, Feb. 23, 2017, vol. 164, No. 4, pp. F372-F378.

Dong Hyun Kim et al., Preparation of polystyrene-polyolefin multiblock copolymers by sequential coordination and anionic polymerization, RSC Advances, Jan. 18, 2017, vol. 7, No. 10, pp. 5948-5956.

Itaru Natori et al., Living Anionic Polymerization of 1,3-Cyclohexadiene with the n-Butyllithium/N,N,N1,N1-Tetramethylethylenediamine System. Copolymerization and Block Copolymerization wtih Styrene, Butadiene, and Isoprene, Macromolecules, Jan. 31, 1998, vol. 31, No. 4, pp. 982-987.

Extended European Search Report including Written Opinion for Application No. EP18775774.5 dated Feb. 17, 2020, 6 pages.

* cited by examiner

[FIG. 1]
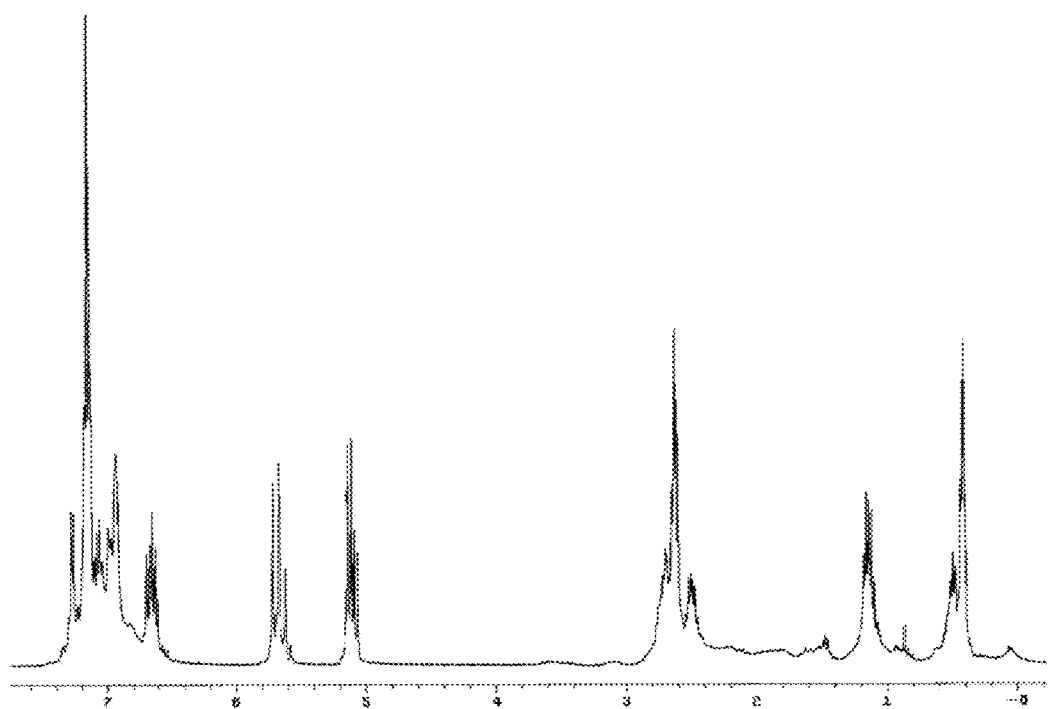

[FIG. 2]
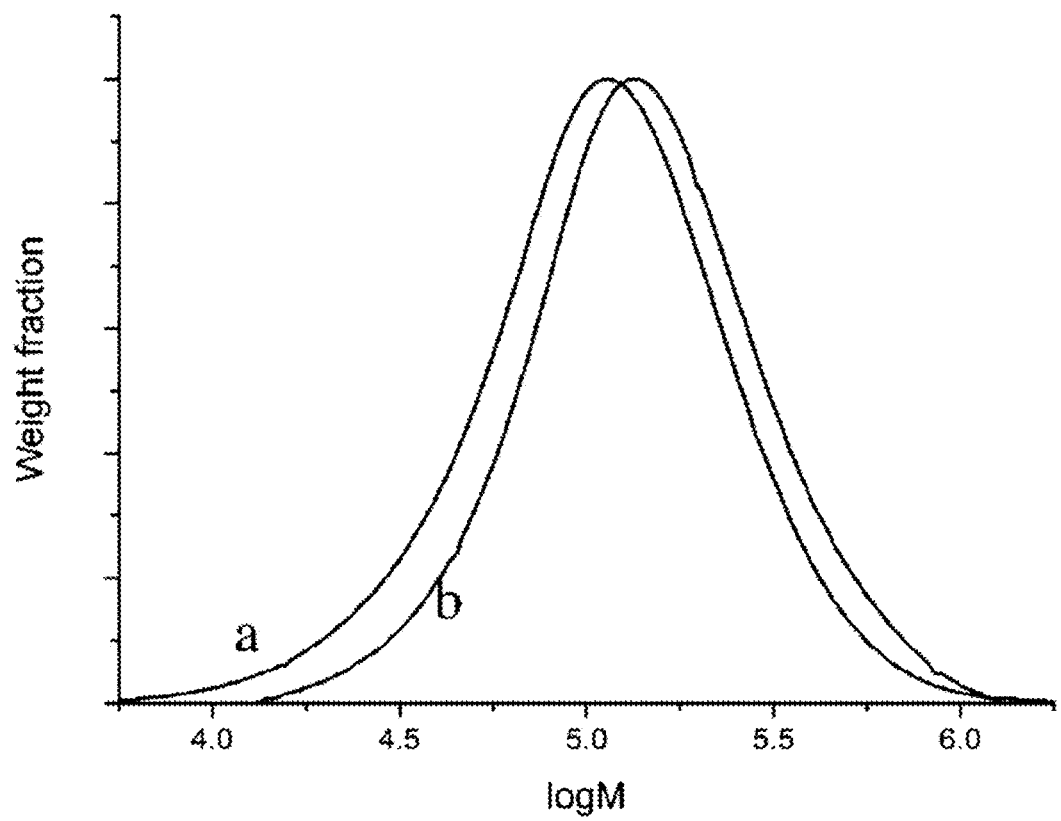
[FIG. 3]
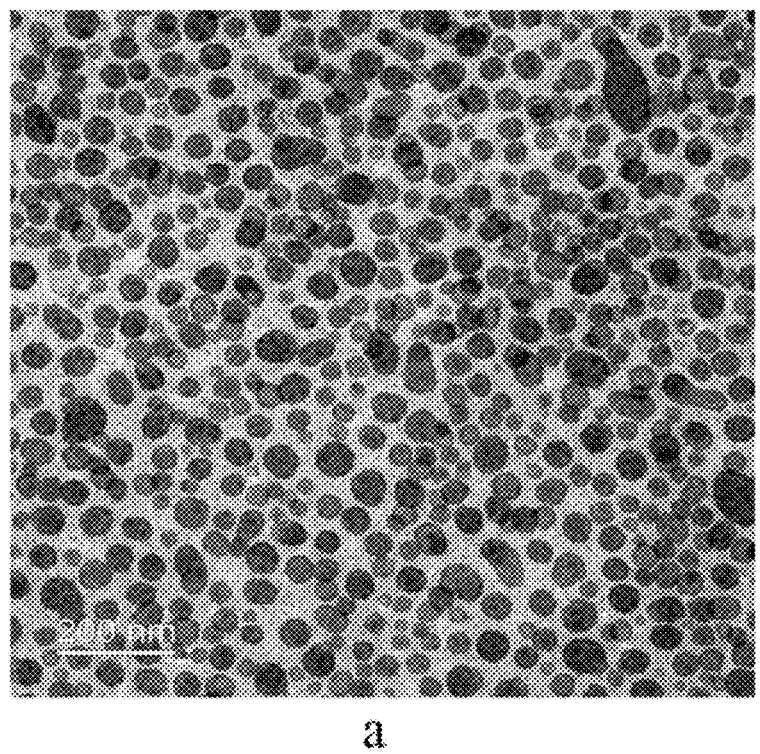
a

[FIG. 4]
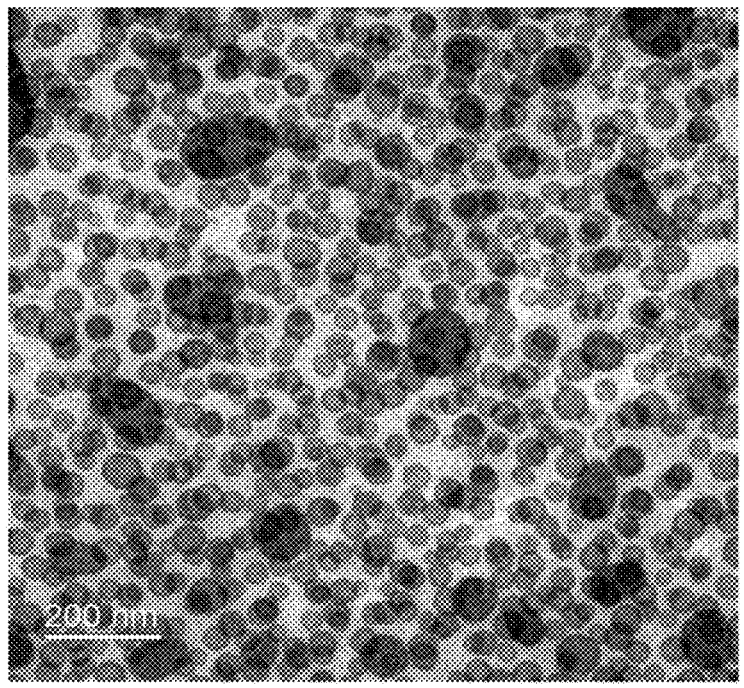
b
[FIG. 5]
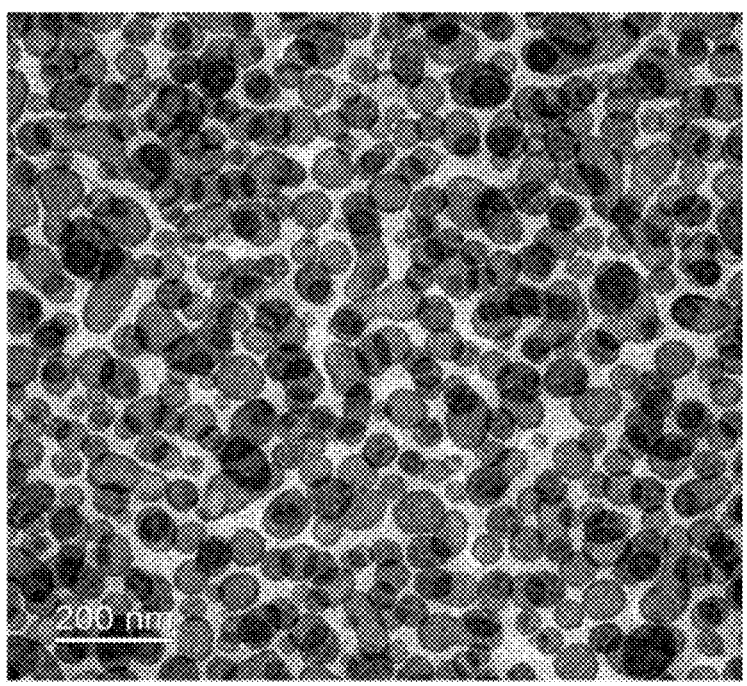
c

[FIG. 6]
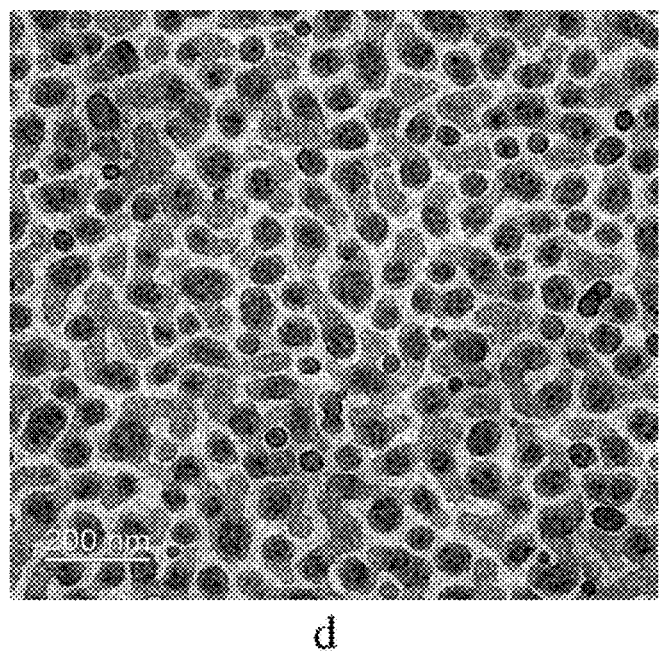
d

[FIG. 7]
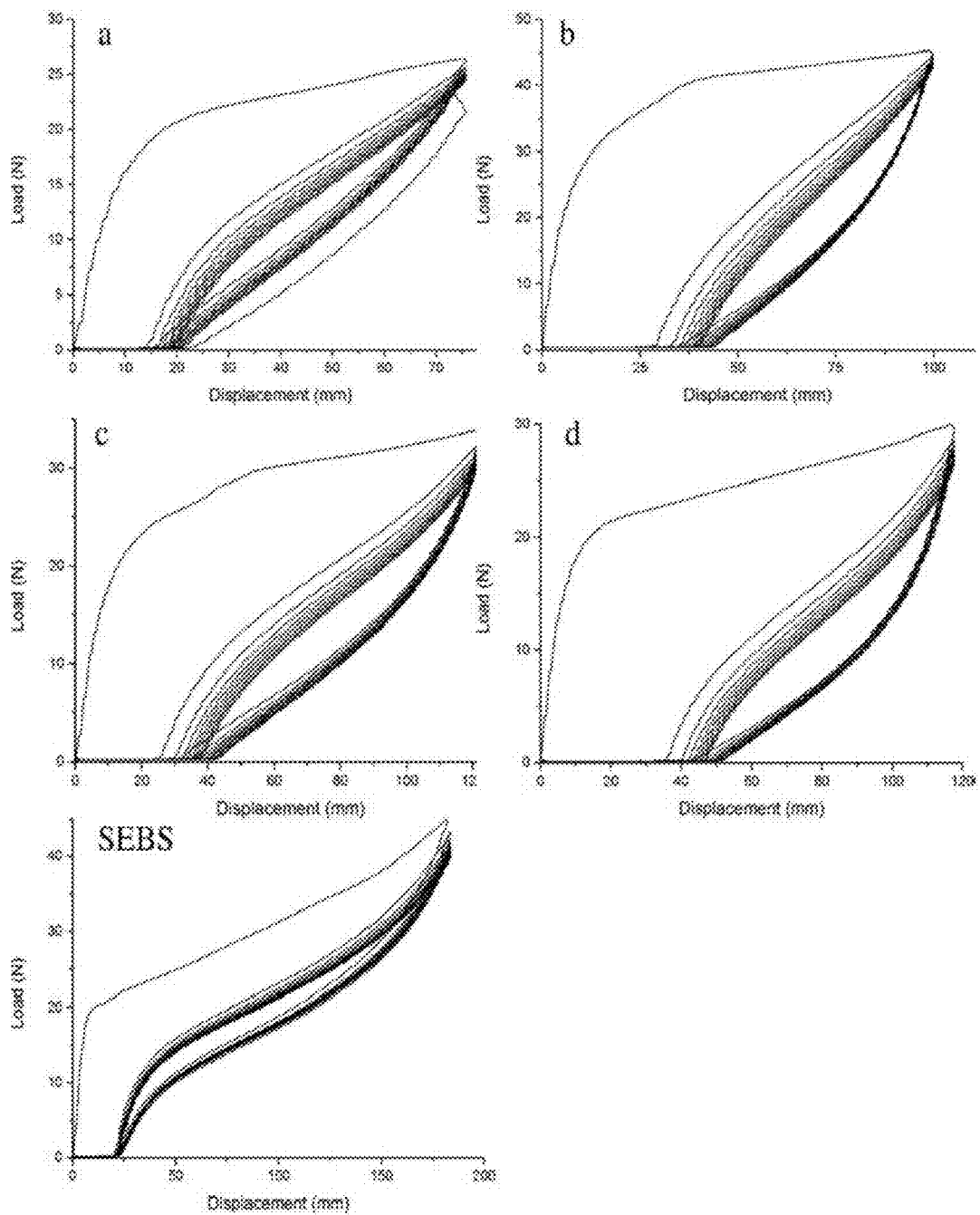

[FIG. 8]
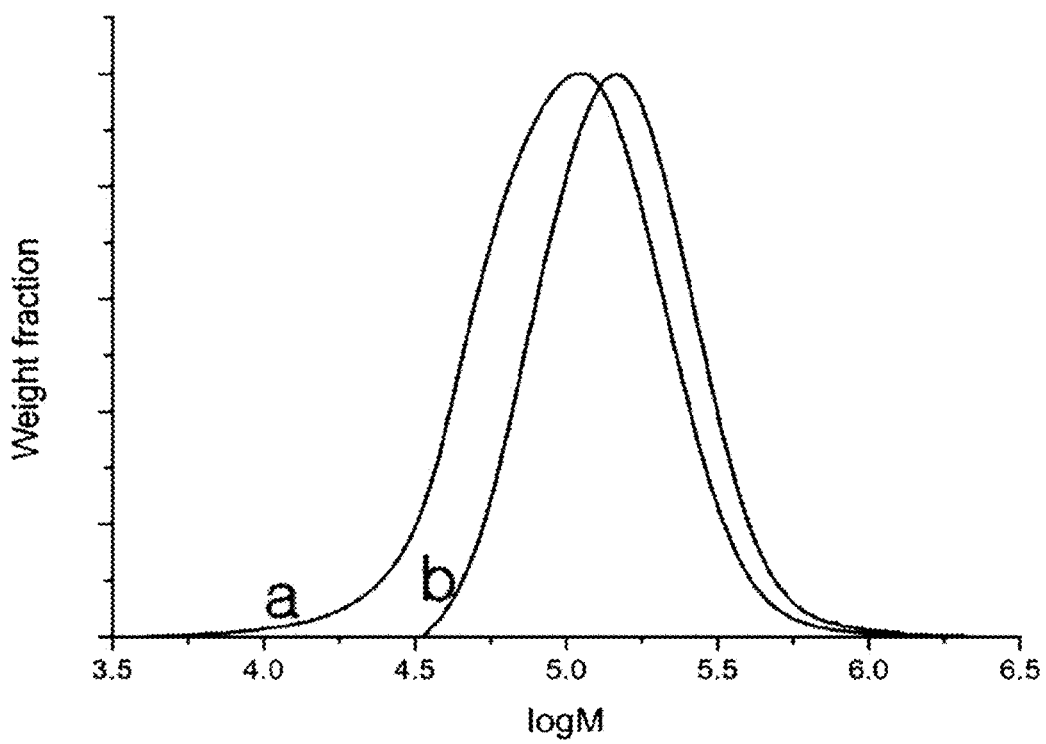
[FIG. 9]
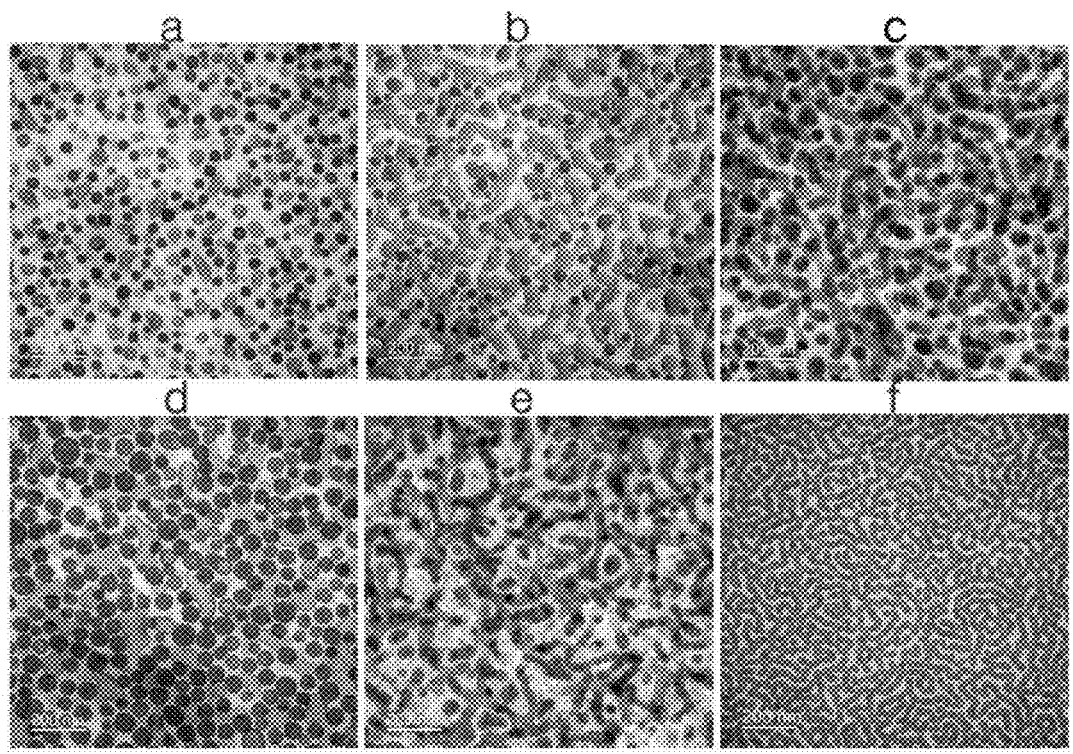

[FIG. 10]
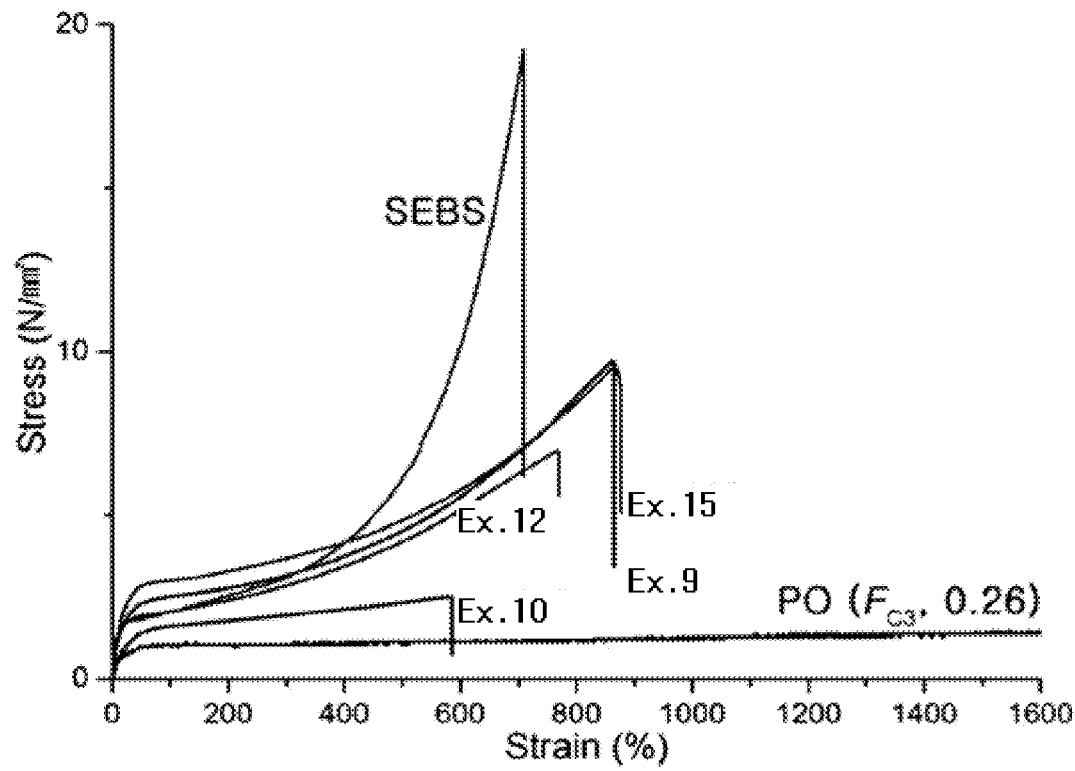
[FIG. 11]
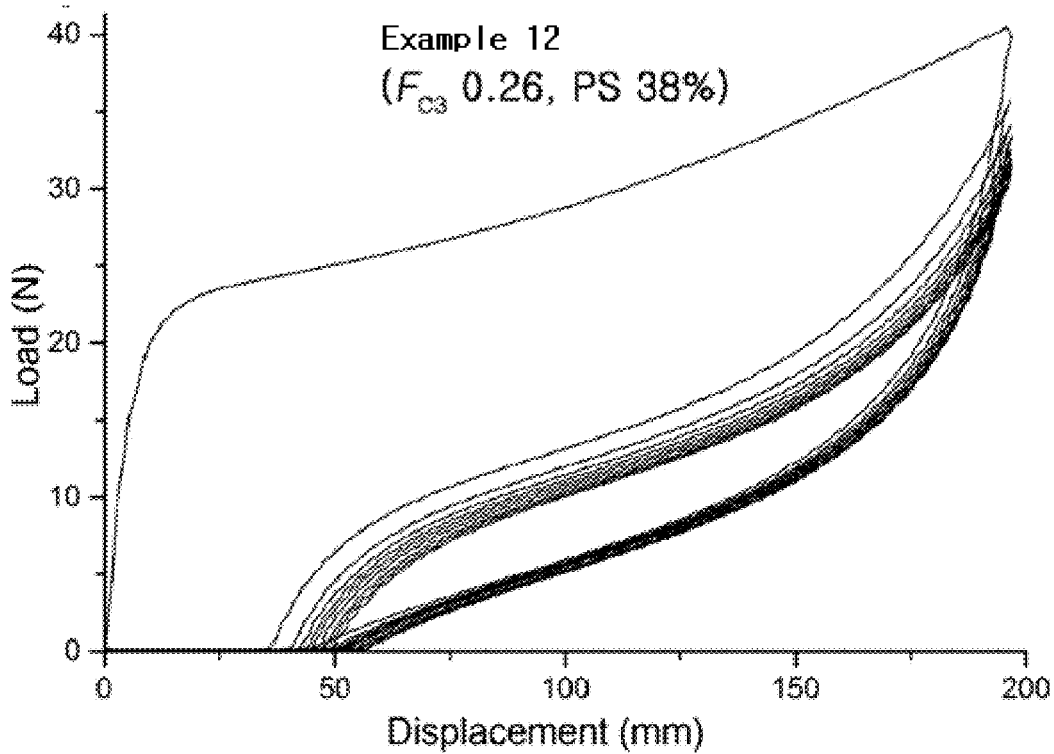

[FIG. 12]
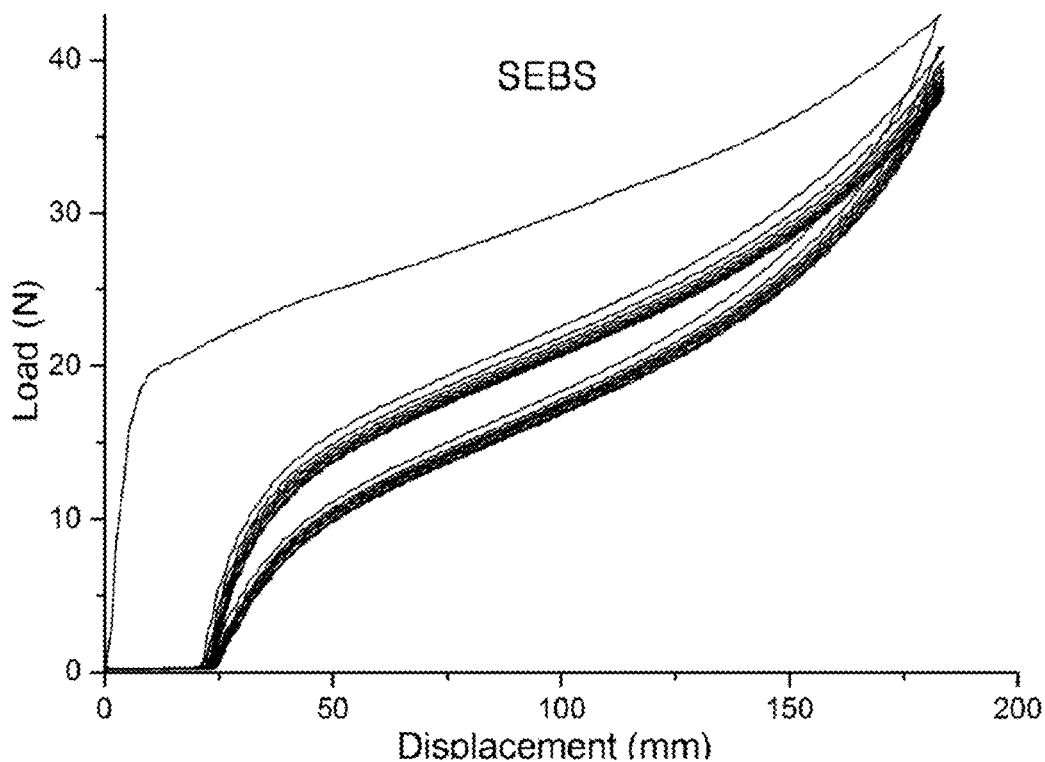
[FIG. 13]
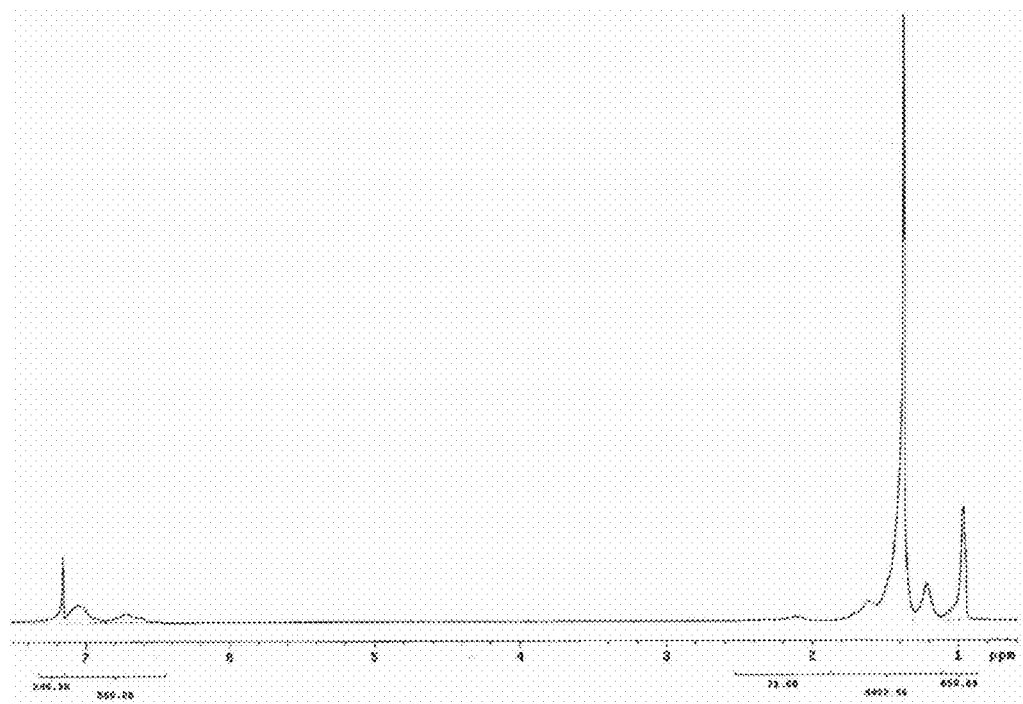

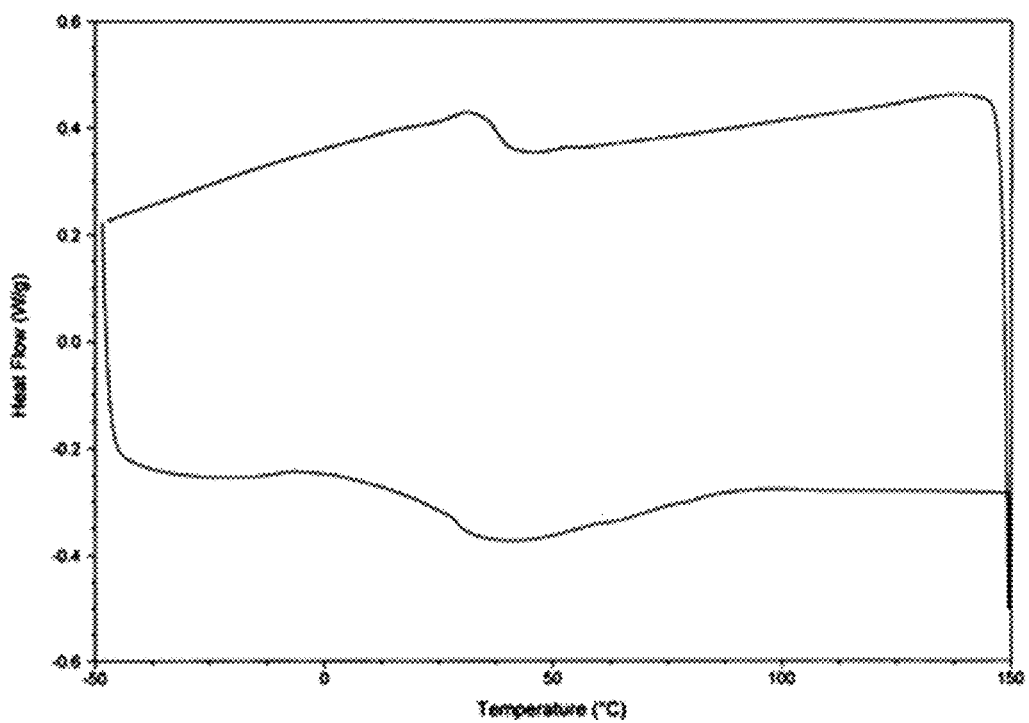
[FIG. 14]

POLYOLEFIN-POLYSTYRENE MULTI-BLOCK COPOLYMER, ORGANOZINC COMPOUND FOR PREPARING SAME, AND METHOD FOR PREPARING POLYOLEFIN-POLYSTYRENE MULTI-BLOCK COPOLYMER

CROSS-REFERENCE TO RELATED APPLICATIONS

The present application is a national phase entry under 35 U.S.C. § 371 of International Application No. PCT/KR2018/001974 filed Feb. 14, 2018, which claims priority from Korean Patent Application No. 10-2017-0042191 filed Mar. 31, 2017, Korean Patent Application No. 10-2017-0093822 filed Jul. 24, 2017, and Korean Patent Application No. 10-2017-0104226 filed Aug. 17, 2017, all of which are incorporated herein by reference.

TECHNICAL FIELD

The present invention relates to a polyolefin-polystyrene multi-block copolymer having a structure in which polystyrene chains are attached to both ends of a polyolefin chain, an organozinc compound for preparing the same, and a method for preparing a polyolefin-polystyrene multi-block copolymer.

BACKGROUND ART

Today, there is a global market for hundreds of thousands of tons of a polyolefin-polystyrene block copolymer, for example, styrene-ethylene/butylene-styrene (SEBS) or styrene-ethylene/propylene-styrene (SEPS). In addition, the polyolefin-polystyrene block copolymer has excellent thermal resistance and light stability, compared to styrene-butadiene-styrene (SBS) or styrene-isoprene-styrene (SIS), and is used as a material for a soft and strong texture of a grip and a handle, an elastic material for a diaper, an oil-gel used in medical and communication materials, an impact modifier formed of engineering plastic, or a flexibilizer or toughener of transparent polypropylene. Conventional SEBS is prepared through a two-step reaction of anionic polymerization between styrene and butadiene and hydrogenation of the SBS obtained thereby. Conventional SEPS is also prepared through a two-step reaction of anionic polymerization between styrene and isoprene and hydrogenation of the SIS obtained thereby. Since the process of saturating all double bonds included in the main chain of a polymer through hydrogenation is expensive, the unit prices of SEBS and SEPS are considerably higher than SBS and SIS before hydrogenation. This may be a limit to market expansion. In addition, since it is indeed impossible to saturate all of the double bonds in the polymer chain through hydrogenation, commercialized SEBS and SEPS include some residual double bonds, and the presence of the double bonds may be problematic.

Therefore, the inventors developed technology of preparing a polyolefin-polystyrene di-block copolymer from olefin and styrene monomers using a one-pot process (Patent Document 1 and Non-patent Document 1).

Industrially more useful block copolymers are triblock or higher polyolefin-polystyrene multi-block copolymers such as the above-described SEBS, and due to the multi-block structure, a thermoplastic elastomer property is realized, and thus has a unique application range. However, until now, no technology of preparing a polyolefin-polystyrene multi-block copolymer from olefin and styrene monomers using a one-pot process has been developed.

PRIOR ART DOCUMENTS

Patent Document 1: Korean Patent No. 1657925
Non-patent Document 1: Journal of Polymer Science, Part A: Polymer Chemistry 2016, 54, 3110-3118.
Non-patent Document 2: J. Am. Chem. Soc. 2005, 127, 9913-9923.

DISCLOSURE

Technical Problem

The present invention is directed to providing a polyolefin-polystyrene multi-block copolymer having a structure in which polystyrene chains are attached to both ends of a polyolefin chain.

The present invention is also directed to providing an organozinc compound that can be easily used in preparation of the polyolefin-polystyrene multi-block copolymer.

The present invention is also directed to providing a one-pot preparation method for directly preparing the polyolefin-polystyrene multi-block copolymer from an olefin monomer and a styrene monomer.

The present invention is also directed to providing a method for preparing a polystyrene-polyolefin-polystyrene tri-block copolymer using a one-pot reaction, which has a dramatically low production cost, and is suitable for realizing physical properties of a thermoplastic elastomer by inhibiting the generation of di-block and homopolymers.

The above-described and other objects of the present invention can be achieved by the present invention to be described below.

Technical Solution

One exemplary embodiment of the present invention provides a polyolefin-polystyrene multi-block copolymer which includes a repeating unit represented by Formula 1 below.

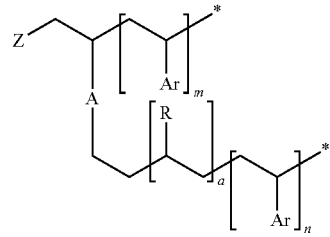

[Formula 1]

In Formula 1, Ar is a substituted or unsubstituted aryl group having 6 to 20 carbon atoms; n is 0 or its average value is 10 to 1,000; the average value of m is 10 to 1,000; A is a substituted or unsubstituted meta- or para-phenylene group; R is any one of hydrogen, a methyl group, an ethyl group, a butyl group and a hexyl group; the average value of a is 10 to 10,000; * is the end of the repeating unit or a site connected with a Z moiety by covalent bonding; and Z is a binding site derived from an anionic polymerization initiator and connected with a silicon atom-containing alkyl group having 1 to 20 carbon atoms, a silicon atom-free alkyl group having 1 to 20 carbon atoms, a silicon atom-containing arylalkyl group having 7 to 20 carbon atoms, a silicon atom-free arylalkyl group having 7 to 20 carbon atoms, or the * by covalent bonding.

In Formula 1, Z is a binding site derived from an anionic polymerization initiator and connected with a silicon atom-containing alkyl group having 1 to 20 carbon atoms, a silicon atom-containing arylalkyl group having 7 to 20 carbon atoms or the * by covalent bonding.

In Formula 1, Ar is an unsubstituted phenyl group; A is an unsubstituted meta- or para-phenylene group; and Z is a binding site connected with $(CH_3)_3SiCH_2$— or the * by covalent bonding.

Another exemplary embodiment of the present invention provides an organozinc compound represented by Formula 2 below.

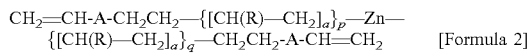

[Formula 2]

In Formula 2, A is a substituted or unsubstituted meta- or para-phenylene group; the average value of a is 10 to 10,000; R is any one of hydrogen, a methyl group, an ethyl group, a butyl group and a hexyl group; and each of p and q is 0 or 1.

The organozinc compound may be represented by Formula 2-1 below.

$CH_2$=CH-A-$CH_2CH_2$—Zn—$CH_2CH_2$-A-CH=$CH_2$  [Formula 2-1]

The organozinc compound may be represented by Formula 2-2 below.

[Formula 2-2]

In Formulas 2-1 and 2-2, A is a substituted or unsubstituted meta- or para-phenylene group; the average value of a is 10 to 10,000; and R is any one of hydrogen, a methyl group, an ethyl group, a butyl group and a hexyl group.

Still another exemplary embodiment of the present invention provides a method for preparing a polyolefin-polystyrene multi-block copolymer represented by Formula 1 described above, which includes: a first step of preparing the compound represented by Formula 2-2 by coordination polymerization of an olefin monomer with a transition metal catalyst in the presence of the organozinc compound represented by Formula 2-1; and a second step of sequentially inputting a silicon atom-containing alkyl lithium compound, a triamine compound and a styrene-based monomer and performing anionic polymerization.

The silicon atom-containing alkyl lithium compound may be represented by Formula 3 below.

$(CH_3)_3SiCH_2Li$  [Formula 3]

The triamine compound may be represented by Formula 4 below.

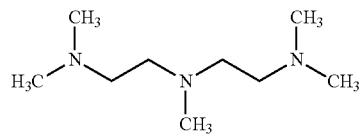

[Formula 4]

The olefin monomer may be ethylene, propylene, 1-butene, 1-hexene, 1-octene, 1-decene or a mixture thereof, and the styrene-based monomer may be styrene.

The polymerization in the first step may be performed by solution polymerization using a solvent including one or more selected from isobutane, hexane, cyclohexane and methylcyclohexane.

The molar ratio (i.e., [Li]/[Zn]) of the silicon atom-containing alkyl lithium compound input in the second step and the organozinc compound represented by Formula 2-1 input in the first step may be 0.5 to 2.

The molar ratio of the triamine compound and the silicon atom-containing alkyl lithium compound input in the second step may be 1:0.5 to 1:1.

The molar ratio ([styrene]/[Zn]) of the styrene monomer input in the second step and a zinc atom in the reaction solution may be 250 to 1,000.

Yet another exemplary embodiment of the present invention provides a polystyrene-polyolefin-polystyrene tri-block copolymer represented by Formula 7 below.

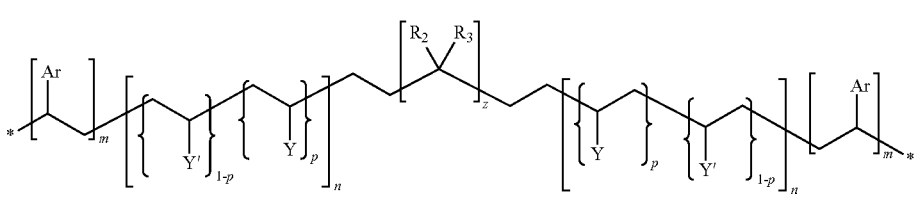

[Formula 7]

In Formula 7, Ar is an aryl group having 6 to 20 carbon atoms; the average value of m is 20 to 10,000; Y and Y' are each independently any one of hydrogen, methyl, ethyl, butyl, hexyl and octyl, Y and Y' are not the same as each other; p and 1-p are the mole fractions of respective repeating subunits constituting repeating unit n, wherein p is 0 to 1; the average value of n is 40 to 10,000; $R^2$ and $R^3$ are each independently hydrogen or a hydrocarbyl having 1 to 20 carbon atoms; and z is an integer of 0 to 10.

In Formula 7, Ar may be phenyl; the average value of m may be 20 to 200; Y may be hydrogen; Y' may be methyl, ethyl, butyl or hexyl; either $R^2$ or $R^3$ may be hydrogen; and z may be 0 or 2.

The polystyrene-polyolefin-polystyrene tri-block copolymer may have a PDI of 1.2 to 1.5.

Yet another exemplary embodiment of the present invention provides a method for preparing a polystyrene-polyolefin-polystyrene tri-block copolymer, which includes: forming a polyolefin block by chain transfer polymerization of an olefin-based monomer using a polynuclear zinc compound as a chain transfer agent; and forming a polystyrene block by sequentially inputting an silicon atom-containing alkyl lithium compound, a triamine compound and a styrene-based monomer and performing anionic polymerization.

The polynuclear zinc compound may be represented by Formula 8 below.

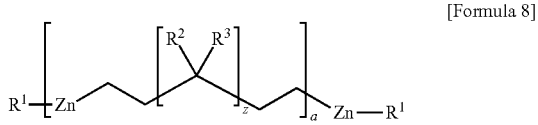

[Formula 8]

In Formula 8, $R^1$ is hydrocarbyl having 1 to 20 carbon atoms; $R^2$ and $R^3$ are each independently hydrogen or hydrocarbyl having 1 to 20 carbon atoms; z is an integer of 0 to 10; and the average value of a is 1 to 10.

The polynuclear zinc compound may be represented by any one of Formula 8-1 or Formula 8-2 below.

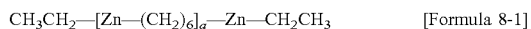

[Formula 8-1]

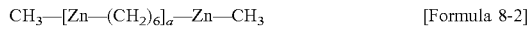

[Formula 8-2]

In Formulas 2-1 and 2-2, the average value of a is 1 to 10.

The silicon atom-containing alkyl lithium compound may be represented by Formula 3.

The triamine compound may be represented by Formula 4.

The molar ratio ([styrene]/[Zn]) of the input styrene monomer per zinc atom in the step of forming the polystyrene block may be 250 to 1,000.

In the polystyrene-polyolefin-polystyrene tri-block copolymer, the number of generated polystyrene polymer chains per zinc atom ([PS-chains]/[Zn]) may be 2.0 to 3.0.

Advantageous Effects

The present invention can provide a polyolefin-polystyrene multi-block copolymer having a commercially useful structure, an organozinc compound for preparing the same and a method of directly preparing the polyolefin-polystyrene multi-block copolymer from an olefin monomer and a styrene monomer using a one-pot method.

DESCRIPTION OF DRAWINGS

FIG. 1 is a $^1$H NMR spectrum of an organozinc compound represented by Formula 2-1, prepared in Preparation Example 1 of the present invention.

FIG. 2 is a graph exhibiting the GPC analysis result of a block copolymer prepared in Example 5 of the present invention.

FIG. 3 is a TEM image of a block copolymer prepared in Example 3 of the present invention.

FIG. 4 is a TEM image of a block copolymer prepared in Example 4 of the present invention.

FIG. 5 is a TEM image of a block copolymer prepared in Example 5 of the present invention.

FIG. 6 is a TEM image of a block copolymer prepared in Example 8 of the present invention.

FIG. 7 shows the results obtained by repeated tensile tests for the block copolymers prepared in Examples 2, 3, 5 and 8 of the present invention and a copolymer used in Comparative Example 1.

FIG. 8 shows the result of GPC analysis for a tri-block copolymer prepared in Example 9 of the present invention.

FIG. 9 is a set of transmission electron microscope images of tri-block copolymers prepared in Example 19(e), Example 11(a), Example 12(c), Example 13(b), Example 15(d) of the present invention and Comparative Example 1(f).

FIG. 10 is a graph showing a stress measurement result among the results of tensile tests according to Examples 9, 10, 12 and 15 of the present invention.

FIG. 11 is the result of repeated tensile tests for the tri-block copolymer prepared in Example 12 of the present invention.

FIG. 12 is the result of repeated tensile tests for the tri-block copolymer of Comparative Example 1.

FIG. 13 is a $^1$H NMR spectrum of the tri-block copolymer prepared in Example 12 of the present invention.

FIG. 14 shows the DSC analysis result of the tri-block copolymer prepared in Example 10 of the present invention.

MODES OF THE INVENTION

Alphabetical symbols of formulas shown in the specification mean elements indicated by the corresponding symbols unless otherwise specified, Me is methyl, Et is ethyl, PO is polyolefin, PS is polystyrene, PE is polyethylene, and PP is polypropylene.

The "polymer" used herein includes all of an oligomer, a homopolymer, and a copolymer unless otherwise specified.

The symbol "*" used herein refers to an end group of a polymer chain.

Polyolefin-Polystyrene Multi-Block Copolymer

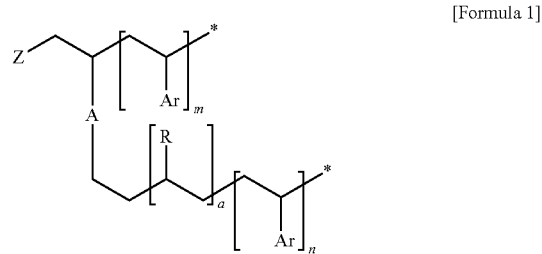

[Formula 1]

In Formula 1, Ar is a substituted or unsubstituted aryl group having 6 to 20 carbon atoms; n is 0 or its average value is 10 to 1,000; the average value of m is 10 to 1,000; A is a substituted or unsubstituted meta- or para-phenylene group; R is any one of hydrogen, a methyl group, an ethyl group, a butyl group and a hexyl group; the average value of a is 10 to 10,000; * is each independently the end of the repeating unit or a site connected with a Z moiety by covalent bonding; and Z is a binding site derived from an anionic polymerization initiator and connected with a silicon atom-containing alkyl group having 1 to 20 carbon atoms, a silicon atom-free alkyl group having 1 to 20 carbon atoms, a silicon atom-containing arylalkyl group having 7 to 20 carbon atoms, a silicon atom-free arylalkyl group having 7 to 20 carbon atoms, or the * by covalent bonding.

The polyolefin-polystyrene multi-block copolymer including a repeating unit having a structure represented by Formula 1 is a compound first disclosed by the preparation method of the present invention.

In the specification, the repeating unit a refers to a polyolefin block structurally included in the multi-block copolymer of Formula 1. Likewise, the repeating unit n and the repeating unit m refer to respective polystyrene blocks structurally included in the multi-block copolymer of Formula 1. At the same time, a, n and m may be values that indicate the degrees to which respective repeating units in Formula 1 are repeated.

In typical polymer synthesis, a mixture in which the values of a, n and m have a certain distribution, rather than single integers, is obtained, and therefore, in the specification, the average values of a, n and m are measured and mentioned.

In Formula 1, Ar is each independently a substituted or unsubstituted aryl group having 6 to 20 carbon atoms. When the aryl group having 6 to 20 carbon atoms is substituted, a substituent may be, but not particularly limited, specifically, a hydrocarbyl group having 1 to 5 carbon atoms, for example, methyl, ethyl, propyl, butyl, pentyl and an isomer thereof. In addition, the hydrocarbyl used as the substituent may be a cyclic, acyclic, branched or straight-chained type.

Specifically, the aryl group having 6 to 20 carbon atoms may include a monocyclic aryl group, a polycyclic aryl group or a heteroaryl group, for example, a monocyclic aryl group such as benzyl, phenyl, biphenyl, terphenyl or tolyl; or a polycyclic aryl group such as naphthyl, anthracenyl, or phenanthrenyl.

In Formula 1, respective lengths of the repeating unit n (—[$CH_2$—CH(Ar)]$_n$— of Formula 1) and the repeating unit m (—[$CH_2$—CH(Ar)]$_m$— of Formula 1) representing a polystyrene block may be adjusted according to an amount of the styrene monomer input as a reaction material in the preparation of a polyolefin-polystyrene multi-block copolymer.

The n of Formula 1 is 0 or its average value is 10 to 1,000. When n is 0, the end group of the polyolefin chain (i.e., —[CH(R)$CH_2$]$_a$—*) may covalently bond with the Z moiety of Formula 1 of the same molecule or the Z moiety of Formula 1 of another molecule. Such a structure may be formed by reacting the end group of the polyolefin chain in the second step of a method for preparing a polyolefin-polystyrene multi-block copolymer to be described below with a styrene group included in an organozinc compound before a reaction with the input styrene monomer.

In addition, the average value of each of n and m may be 10 to 1,000. While there is no limit to the lower limit, when the average values of n and m are more than 1,000, viscosity is increased, and thus it is difficult to realize the compound having the structure of Formula 1. Specifically, the average value of each of n and m in Formula 1 may be 100 to 500. In the above range, the repeating units may be more effective in preparing the multi-block copolymer of Formula 1, and the prepared multi-block copolymer may be applied in more various fields.

In Formula 1, A is a substituted or unsubstituted meta- or para-phenylene group. When the meta-phenylene group or para-phenylene group is substituted, a substituent may be, but not particularly limited, specifically, a hydrocarbonyl group having 1 to 5 carbon atoms, for example, methyl, ethyl, propyl, butyl, pentyl and an isomer thereof. In addition, the hydrocarbyl used as the substituent may be a cyclic, acyclic, branched or straight-chained type.

The average value of a of Formula 1 may be adjusted according to contents of the olefin monomer and the organozinc compound, which are input as reaction materials, in a preparation method to be described. The average value of a is 1 or more, but there is no lower limit. However, when the average value of a is more than 10,000, viscosity is increased, and thus it is not easy to realize the compound having the structure of Formula 1. Specifically, the average value of a of Formula 1 may be 10 to 10,000.

Specifically, the repeating unit a (—[CH(R)—$CH_2$]$_a$— of Formula 1) may be prepared using an olefin monomer including ethylene, propylene, 1-butene, 1-hexene, 1-octene, and 1-decene as a reaction material in the preparation method.

As an exemplary embodiment, the repeating unit a may be prepared using one of olefin monomers including ethylene, propylene, 1-butene, 1-hexene, 1-octene, 1-decene, or two of olefin monomers including ethylene, propylene, 1-butene, 1-hexene, 1-octene, and 1-decene as a reaction material in the preparation method. Specifically, the repeating unit a of Formula 1 may be polyethylene, polypropylene, poly(ethylene-co-propylene), poly(ethylene-co-1-butene), poly(ethylene-co-1-hexene), or poly(ethylene-co-1-octene).

In Formula 1, * is each independently an end group of Formula 1 or a region connected with a Z moiety by covalent bonding. Specifically, in Formula 1, when * is an end group, the end group may vary according to a termination condition after a reaction in the preparation method. For example, depending on a termination condition, * may be reacted with oxygen, resulting in —OH, or reacted with water, resulting in —H. In addition, in some cases, * may be reacted with the styrene region included in the organozinc compound in the styrene polymerization in a preparation method to be described, thereby being connected with the Z moiety of Formula 1 in the same molecule or the Z moiety of Formula 1 in another molecule by covalent bonding.

In Formula 1, Z is a binding site derived from an anionic polymerization initiator and connected with a silicon atom-containing alkyl group having 1 to 20 carbon atoms, a silicon atom-free alkyl group having 1 to 20 carbon atoms, a silicon atom-containing arylalkyl group having 7 to 20 carbon atoms, a silicon atom-free arylalkyl group having 7 to 20 carbon atoms, or the * by covalent bonding.

Specifically, in Formula 1, Z is a binding site derived from a silicon atom-containing alkyl lithium compound among anionic polymerization initiators, and connected with a silicon atom-containing alkyl group having 1 to 20 carbon atoms, a silicon atom-containing arylalkyl group having 7 to 20 carbon atoms, or the * by covalent bonding.

More specifically, Ar in Formula 1 may be an unsubstituted phenyl group; A may be an unsubstituted meta- or para-phenylene group; and Z may be $(CH_3)_3SiCH_2$—, or a binding site connected with the * part of a repeating unit of a different molecule or a repeating unit of the same molecule by covalent bonding. In this case, excellent economic feasibility and more excellent commercial utility may be exhibited, and more excellent reaction activity during preparation may be exhibited.

In an exemplary embodiment, the copolymer consisting of repeating units represented by Formula 1 may be a polystyrene-polyolefin-polystyrene tri-block copolymer, a polystyrene-polyolefin-polystyrene-polyolefin-polystyrene penta-block copolymer, a polystyrene-polyolefin-polystyrene-polyolefin-polystyrene-polyolefin-polystyrene hepta-block copolymer or a mixture thereof.

For example, when Z in Formula 1 is an alkyl or arylalkyl group derived from an initiator, and all of the * moieties are end groups, Formula 1 may be a tri-block copolymer.

For example, when Z in Formula 1 is connected with * at the end of the polyolefin chain among the repeating units of Formula 1 of a different molecule wherein n is 0 by covalent bonding, the structure of a penta-block copolymer may be formed.

For example, when Z at the end of the penta-block copolymer is connected with * at the end of polyolefin chain among the repeating units of Formula 1 of a third molecule wherein n is 0 by covalent bonding, the structure of a hepta-block copolymer may be formed.

Organozinc Compound

Another exemplary embodiment of the present invention provides an organozinc compound represented by Formula 2 below. The organozinc compound of Formula 2 is very highly suitable for preparing the polyolefin-polystyrene block copolymer of the present invention.

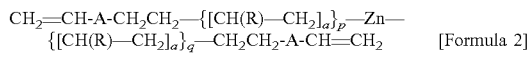   [Formula 2]

In Formula 2, A is a substituted or unsubstituted meta- or para-phenylene group; the average value of a is 10 to 10,000; R is any one of hydrogen, a methyl group, an ethyl group, a butyl group and a hexyl group; and each of p and q is 0 or 1.

In one exemplary embodiment, the organozinc compound of Formula 2 may be a compound represented by Formula 2-1 or Formula 2-2. The compound represented by Formula 2-1 or Formula 2-2 is a compound first disclosed by the present invention, the supply of a raw material for which is easy, and which has a low production cost, excellent productivity and very high commercial potential for a mass production process.

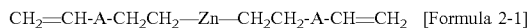   [Formula 2-1]

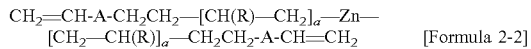   [Formula 2-2]

In Formulas 2-1 and 2-2, A is a substituted or unsubstituted meta- or para-phenylene group; the average value of a is 10 to 10,000; and R is any one of hydrogen, a methyl group, an ethyl group, a butyl group and a hexyl group.

Specifically, the organozinc compound of Formula 2-1 may be prepared, for example, by reacting excessive $CH_2=CH-C_6H_4-CH=CH_2$ with $Et_2BH$ as shown in Reaction Scheme 1 below, and then reacting the resulting product with $Et_2Zn$. As such, when the $CH_2=CH-C_6H_4-CH_2CH_2-Zn-CH_2CH_2-C_6H_4-CH=CH_2$ compound is prepared according to Reaction Scheme 1, a high yield can be obtained, and the prepared organozinc compound can be directly used without a specific purification process. In addition, the organozinc compound of Formula 2-1 serves as a polymerization inhibitor to prevent polymerization with an undesired styrene group, and thus not cause problems in storage and transportation.

[Reaction Scheme 1]

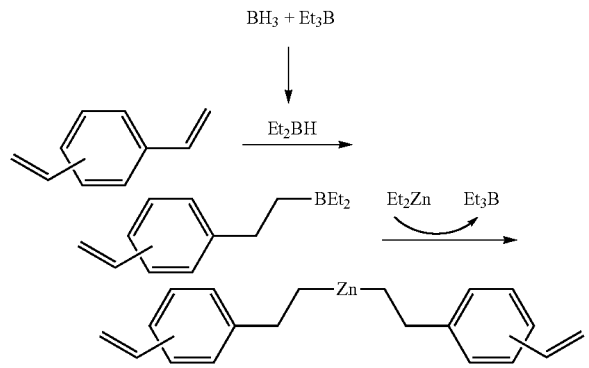

Here, the $CH_2=CH-C_6H_4-CH=CH_2$ and $Et_2Zn$ compounds used as reaction materials in Reaction Scheme 1 are materials that are used in large quantities in current industry, and thus are advantageous for the supply of raw materials and can reduce a process cost and further improve industrial productivity. In addition, $Et_2BH$ used as a reaction material in Reaction Scheme 1 is a material obtained by simply mixing $BH_3$ and $Et_3B$, wherein $BH_3$ is a material that can be easily purchased in a large quantity, and $Et_3B$ is a by-product of the present reaction and thus can be used after recovery from the reaction, thereby achieving further facilitation of the supply of a raw material, lower production costs, and further improvement in commercial productivity.

Specifically, the organozinc compound of Formula 2-2 may be prepared by the first step of a method for preparing a polyolefin-polystyrene multi-block copolymer to be described, for example, using the compound of Formula 2-1. In the organozinc compound represented by Formula 2-2 prepared as described above, one end group of the polyolefin-based repeating unit is connected to zinc, and the other end group is connected to the styrene repeating unit. Due to such a structural characteristic, the organozinc compound of Formula 2-2 may be very useful for the preparation of a polyolefin block and the functionalization of a polyolefin end group in the preparation of the polyolefin-polystyrene multi-block copolymer of Formula 1.

For example, while a method of preparing an organozinc compound to which a polyolefin group is attached by inserting an olefin into a zinc-ethyl group through olefin coordination polymerization in the presence of the organozinc compound such as diethylzinc which is commercially produced in a large amount has been previously disclosed (Non-patent Document 2), the preparation of a structure in which a styrene group is attached to one end and zinc is attached to the other end using a styrene group-containing organozinc compound ($Zn-[CH_2CH_2-C_6H_4-CH=CH_2]_2$) such as the organozinc compound of Formula 2 of the present invention as a precursor has not been reported.

Specifically, the repeating unit a ($-[CH(R)-CH_2]_a-$) of Formula 2 may be prepared using an olefin monomer including ethylene, propylene, 1-butene, 1-hexene, 1-octene or 1-decene as a reaction material in the preparation method.

In an exemplary embodiment, the repeating unit a of Formula 2 may be prepared using one of the olefin monomers including ethylene, propylene, 1-butene, 1-hexene, 1-octene or 1-decene, or two of the olefin monomers including ethylene, propylene, 1-butene, 1-hexene, 1-octene or 1-decene as a reaction material in the preparation method.

Specifically, the repeating unit a of Formula 2 may be polyethylene, polypropylene, poly(ethylene-co-propylene), poly(ethylene-co-1-butene), poly(ethylene-co-1-hexene), or poly(ethylene-co-1-octene).

Method of Preparing Polyolefin-Polystyrene Multi-Block Copolymer

Yet another exemplary embodiment of the present invention provides a method for preparing a polyolefin-polystyrene multi-block copolymer represented by Formula 1 described above, which includes: a first step of preparing the compound represented by Formula 2-2 through coordination polymerization of an olefin monomer using a transition metal catalyst in the presence of the organozinc compound represented by Formula 2-1; and a second step of performing anionic polymerization by sequentially inputting a silicon atom-containing alkyl lithium compound, a triamine compound and a styrene-based monomer.

In the case of the polyolefin-polystyrene multi-block copolymer represented by Formula 1 prepared by the above-described preparation method, the organozinc compound represented by Formula 2-2 in which a desired polyolefin chain is grown is formed from the organozinc compound of Formula 2-1, and then a polystyrene block is formed at an end group of the polyolefin chain by styrene anionic polymerization, thereby further increasing a thermoplastic elastomer property of the polyolefin-polystyrene multi-block copolymer.

First Step

In the first step, the compound represented by Formula 2-2 described above is prepared by coordination polymerization of an olefin monomer using a transition metal catalyst in the presence of the organozinc compound represented by Formula 2-1 described above.

Specifically, the olefin monomer input as a reaction material in the first step may be a monomer formed of ethylene, propylene, 1-butene, 1-hexene, 1-octene, 1-decene or a mixture thereof, which may be used alone or in combination of two or more thereof.

In the first step, when ethylene, propylene or 1-butene, which has a relatively low boiling point, is used as an olefin monomer, polymerization may be performed under a certain pressure.

In one exemplary embodiment, the olefin monomer input as a reaction material in the first step may be a monomer including a mixture of two or more of ethylene, propylene, 1-butene, 1-hexene and 1-octene. In this case, in the prepared organozinc compound of Formula 2-2, the repeating unit a may include a structure of, for example, HDPE, MDPE, LLDPE, VLDPE, POE or EP.

While there is no limit on a transition metal catalyst used in the first step, a homogeneous (metallocene) catalyst, which includes a transition metal catalyst as a main catalyst and/or an organoaluminum or boron compound as a cocatalyst, or a heterogeneous Ziegler catalyst may be conventionally used as the transition metal catalyst. In an exemplary embodiment, a homogeneous catalyst is preferable due to more excellent catalytic activity.

Specifically, the transition metal catalyst may include a compound represented by Formula 5 or 6 below.

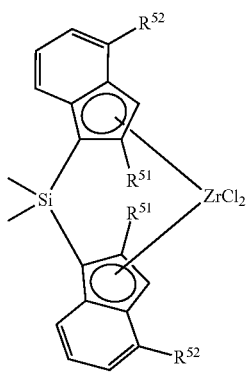

[Formula 5]

In Formula 5, $R^{51}$ is hydrogen or methyl, and $R^{52}$ is hydrogen or phenyl.

When the compound represented by Formula 5 is used as the transition metal catalyst, it may be more effective in growing a polyolefin chain from an organozinc compound. In addition, the transition metal catalyst may be one that is activated by a methylaluminoxane (MAO) or boron-based cocatalyst.

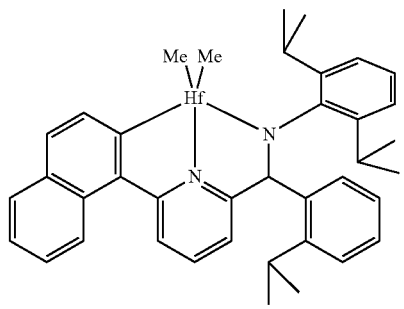

[Formula 6]

When the compound represented by Formula 6 is used as the transition metal catalyst, it prevents an unnecessarily occurring beta-elimination process, which may be more effective in growing a uniform polyolefin chain from the organozinc compound. In addition, the transition metal catalyst may be one that is activated by $[(C_{18}H_{37})_2MeNH]^+[B(C_6F_5)_4]^-$, a methylaluminoxane (MAO), or boron-based cocatalyst.

The first step may be performed, for example, in a homogeneous solution state. Here, a hydrocarbon solvent may be used as a solvent, or an olefin monomer itself may be used as a medium. The hydrocarbon solvent may be an aliphatic hydrocarbon solvent having 4 to 20 carbon atoms, and specifically, isobutane, hexane, cyclohexane or methylcyclohexane, which may be used alone or in combination of two or more thereof.

The polymerization temperature of the first step may vary according to a reaction material, a reaction condition, etc., and specifically, 70 to 170° C. Within the above range, the solubility of the polymer may be increased, and the catalyst may be thermally stabilized.

The polymerization in the first step may be performed batchwise, semi-continuously or continuously, or performed in two or more steps with different reaction conditions.

The compound represented by Formula 2-1 prepared by the first step of each of the above-described embodiments may serve as a precursor for preparing the above-described polyolefin-polystyrene multi-block copolymer represented by Formula 1 through anionic polymerization in the second step to be described below.

Second Step

A polyolefin-polystyrene multi-block copolymer may be prepared by sequentially inputting an alkyl lithium compound, a triamine compound and a styrene-based monomer in the first step described above and performing anionic polymerization.

In the second step, a styrene-based monomer may be continuously inserted into the zinc-carbon bond included in the compound of Formula 2-2 formed in the first step described above, and at the same time, the styrene group present at the end group of the compound represented by Formula 2-2 participates in the reaction as a copolymerization site with the styrene-based monomer, resulting in connection to the polystyrene chain. As a result, the above-described polyolefin-polystyrene multi-block copolymer of Formula 1 may be prepared by a one-pot method.

Specifically, the styrene-based monomer may be a styrene-based monomer having 6 to 20 carbon atoms. More specifically, the styrene-based monomer may be a styrene-based monomer such as ethylene substituted with an aryl group having 6 to 20 carbon atoms or ethylene substituted with a phenyl group, for example, styrene.

It is a well-known fact that the organozinc compound itself cannot properly serve as an initiator in styrene polymerization. That is, when only the styrene-based monomer is input after the coordination polymerization in the first step, polymerization does not progress at all. In addition, when styrene polymerization is carried out using a silicon atom-containing alkyl lithium compound as an initiator in a hydrocarbon solvent in the presence of the organozinc compound, the polystyrene block is formed in-between the zinc-carbon bond on a side where a polyolefin block is formed, and the styrene-based monomer is not inserted into the zinc-carbon bond at the end group at which the silicon atom is present. In this case, the organozinc compound remains as it is without participating in a polymer chain formation reaction, which is also a known fact.

In the second step of the present invention, the styrene-based monomer is inserted into the zinc-carbon bond in Formula 2-2 formed in the first step through anionic polymerization performed by sequentially inputting a silicon atom-containing alkyl lithium compound, a triamine compound and a styrene-based monomer in the above-described first step, thereby obtaining the above-described multi-block copolymer represented by Formula 1. In the second step, the silicon atom-containing alkyl lithium compound and the triamine compound may act in combination as an initiator. Accordingly, the production amount of a polystyrene homopolymer that can be generated when a conventional initiator is used may be reduced.

Specifically, the silicon atom-containing alkyl lithium compound may be a compound represented by Formula 3 below.

(CH$_3$)$_3$SiCH$_2$Li  [Formula 3]

The silicon atom-containing alkyl lithium compound is a material widely used as an initiator for the anionic polymerization, and is easily obtained and applied in the present invention.

Specifically, the triamine compound may be a compound represented by Formula 4 below.

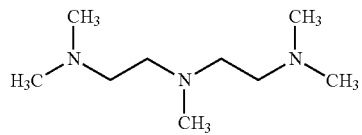

[Formula 4]

The compound of Formula 4 is a compound facilitating coordination to lithium, and thus used to improve reactivity as a base or a nucleophile of the silicon atom-containing alkyl lithium compound, and is easily obtained and has low unit costs.

The inventors have developed and disclosed a method of growing a polystyrene chain from the zinc-carbon bond of an organozinc compound (Patent Document 1 and Non-patent Document 1). In the prior art invention, styrene polymerization was performed by inputting nBuLi. (TMEDA; tetramethylethylenediamine) as an initiator. Here, unique orange styryl anions observed at the beginning gradually turned yellowish brown, and finally became opaque black, indicating an anion breakdown phenomenon for growing a polymer chain, and the polydispersity index (PDI) of the prepared polystyrene is somewhat disadvantageously large (Mw/Mn, ~1.5). In addition, in the prior art invention, when the molar ratio (i.e., [styrene]/[Zn]) of the input styrene-based monomer and the zinc atom in the organozinc compound is as small as 500 or less, the polystyrene chain is grown from only a part of the Zn—C bonds present in the organozinc compound, not from all of the Zn—C bonds, which is disadvantageous. As such, when the polystyrene chain is grown only from a part of the Zn—C bonds of the organozinc compound, a polystyrene-polyolefin di-block or a polyolefin homopolymer is generated and thus hinders the realization of the thermoplastic elastomer property.

In the method for preparing a polyolefin-polystyrene multi-block copolymer of the present invention, it can be confirmed that a yellow color is maintained without a color change during polymerization through anionic polymerization by inputting Me$_3$SiCH$_2$Li.(pentamethyldiethylenetriamine; PMDETA), which is a representative compound of Formula 3 or 4, as an initiator, showing that anions at the growth point of the polymer chain are alive and not destroyed. Therefore, the PDI of the prepared polystyrene chain may be relatively lowered. In this case, the PDI value of the prepared multi-block copolymer is preferably 1.2 to 1.5, and more preferably a Mw/Mn of 1.3.

In Examples and Experimental Examples of the present invention to be described below, when the compounds of Formulas 3 and 4 are used as initiators, it was confirmed that polystyrene chains are grown from all of the Zn—C bonds of the input Zn compound, and thus it can be confirmed that the generation of a polystyrene-polyolefin di-block or polyolefin homopolymer is inhibited and the selectivity of the multi-blocks may be further improved.

In addition, it was confirmed that a polystyrene chain is grown from a silicon atom-containing lithium compound only in very few cases, demonstrating that the generation of an undesired polystyrene homopolymer is also partially inhibited (the polystyrene chain grown from the Zn—C bond is a block copolymer, and a polystyrene chain grown from Me$_3$SiCH$_2$Li is an undesired polystyrene homopolymer).

That is, in the present invention, by newly using the compounds of Formulas 3 and 4 (e.g., Me$_3$SiCH$_2$Li.(PMDETA)) as initiators, the production amounts of a PS homopolymer, a PO homopolymer and a PO-PS di-block copolymer are inhibited, and the generation of a polyolefin-polystyrene multi-block copolymer, which is the object of the present invention, is maximized, resulting in proper realization of the thermosetting elastomer property.

Conventionally, the anionic polymerization in the second step is not affected with a transition metal catalyst used in olefin polymerization during the formation of a polyolefin block in the first step, which is a trace amount compared to an alkyl lithium compound input to form a polystyrene block in the second step. On the other hand, when an organoaluminum-based cocatalyst is additionally used in olefin polymerization in the first step, the amount of the cocatalyst used herein may be not negligible compared to the alkyl lithium compound input in the second step.

Conventionally, the organoaluminum compound forms a complex with an alkyl lithium compound at a 1:1 ratio (an Al:Li ratio), which does not initiate anionic polymerization. However, when the Li/Al ratio is 1 or more, the anionic polymerization is initiated, and a styrene chain may be grown from all of input alkyl lithium compounds containing the alkyl lithium forming a complex with the organic aluminum compound at a 1:1 ratio.

That is, when anionic polymerization in the second step is performed after the first step using the organoaluminum compound as a cocatalyst, the mole number of an input silicon atom-containing alkyl lithium compound should be the same or higher than the mole number of aluminum included in the organoaluminum compound input in the first step. In consideration of a reaction rate and to efficiently grow the polystyrene chain between the organo-zinc bond, the molar number of the silicon atom-containing alkyl lithium compound remaining after the reaction with organoaluminum (i.e., "the molar number of Li–the molar number of Al") may be 0.2 fold or higher than the molar number of the zinc compound of Formula 2.

In an exemplary embodiment, the molar ratio (i.e., [Li]/[Zn]) of Me$_3$SiCH$_2$Li.(PMDETA) with respect to the organozinc compound input in the first step may be 0.5 to 2.0. In this case, Me$_3$SiCH$_2$Li and PMDETA may be mixed and then input into a reactor as the Me$_3$SiCH$_2$Li.(PMDETA) complex, or they may be sequentially input into a reactor.

In another exemplary embodiment, the compound of Formula 4 may be added at a molar ratio of 1:0.5 to 1:1.0, for example, 1:1 with respect to the silicon atom-containing alkyl lithium compound of Formula 3.

In still another exemplary embodiment, the molar ratio ([styrene]/[Zn]) of the styrene monomer input in the second step with respect to zinc atoms in a reaction solution may be 250 to 1,000, and more specifically, 250 to 500.

Specifically, the silicon atom-containing alkyl lithium compound of Formula 3 and the compound of Formula 4 may be mixed in an aliphatic hydrocarbon solvent before input, or the silicon atom-containing alkyl lithium compound of Formula 3 and the compound of Formula 4 may be sequentially input into a reactor.

A temperature for the anionic polymerization in the step of forming a polystyrene block may vary according to a reaction material or reaction condition, and may be specifically, 40 to 170° C., and more specifically, 100 to 110° C. In the above range, the multi-block copolymer represented by Formula 1 is effectively generated.

The anionic polymerization in the step of forming a polystyrene block may be performed batchwise, semi-continuously or continuously, or in two or more steps with different reaction conditions.

A time for the anionic polymerization in the step of forming a polystyrene block may vary according to a reaction material, a reaction condition, etc., may be, specifically, 0.5 to 10 hours, 0.5 to 8 hours, 0.5 to 5 hours, or 0.5 to 2 hours. The above range is preferable for converting all of the input styrene-based monomer into a multi-block copolymer.

The present invention is characterized by preparing a block copolymer having a specific structure represented by Formula 1 using the above-described organozinc compound represented by Formula 2 through a method in which a polyolefin chain is grown through olefin polymerization and is subjected to subsequent styrene anionic polymerization, and therefore, the present invention achieves a decreased production cost and more excellent industrial utility, and more improved reaction activity in the preparation, compared to the conventional method.

In addition, the present invention may provide a method for preparing a polyolefin-polystyrene multi-block copolymer using a one-pot reaction, resulting in realizing high selectivity, prevention of the decomposition of anions serving as the growth point of the polymer chain, and thus achieving a higher yield.

Polystyrene-Polyolefin-Polystyrene Tri-Block Copolymer

In yet another exemplary embodiment of the present invention, a polystyrene-polyolefin-polystyrene tri-block copolymer represented by Formula 7 below is provided.

[Formula 7]

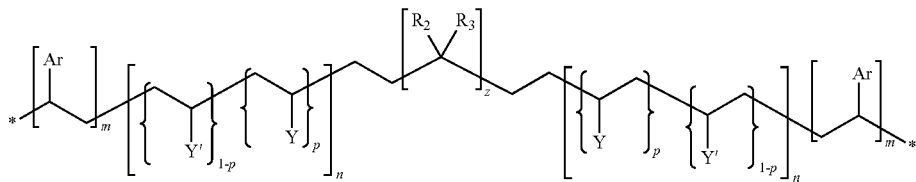

In Formula 7, Ar is an aryl group having 6 to 20 carbon atoms; the average value of m is 20 to 10,000; Y and Y' are each independently any one of hydrogen, methyl, ethyl, butyl, hexyl and octyl, Y and Y' are not the same as each other; p and 1-p are the mole fractions of respective repeating subunits constituting repeating unit n, wherein p is 0 to 1; the average value of n is 40 to 10,000; either $R^2$ or $R^3$ is each independently hydrogen or a hydrocarbyl having 1 to 20 carbon atoms; and z is an integer of 0 to 10.

Specifically, the aryl group having 6 to 20 carbon atoms may be substituted or unsubstituted, and when the aryl group is substituted, a substituent may be, for example, a hydrocarbyl group having 1 to 5 carbon atoms, for example, methyl, ethyl, propyl, butyl, pentyl or an isomer thereof, but the present invention is not particularly limited thereto. In addition, the hydrocarbyl used as the substituent may be a cyclic, acyclic, branched or straight-chained type.

Specifically, the aryl group having 6 to 20 carbon atoms may include a monocyclic aryl, polycyclic aryl or heteroaryl group, for example, a monocyclic aryl group such as benzyl, phenyl, biphenyl, terphenyl or tolyl; or a polycyclic aryl group such as naphthyl, anthracenyl or phenathrenyl.

Specifically, m and n may be used as symbols distinguishing respective repeating units represented by Formula 7, and at the same time, symbols indicating the repeating numbers of respective repeating units. In conventional polymer synthesis, a mixture in which the m and n values have a certain distribution, rather than single integers, is obtained, and therefore, the average values are measured and mentioned.

When the average value of m is less than 20, the generated polymer amount with respect to the input zinc compound is low, thereby a problem in economic efficiency arises, and when the average value of m is very high, which is more than 10,000, viscosity is increased, and the preparation method is not easy and thus it is not easy to realize the compound having the structure of Formula 7. Specifically, the average value of m in Formula 7 may be 20 to 10,000.

When the average value of n is less than 40, due to a small amount of the generated polymer with respect to the input zinc compound, there is a problem in economic efficiency, and when the average value of n is very large, that is, more than 10,000, due to high viscosity, a preparation method is not easy, and thus it is difficult to prepare the compound having the structure of Formula 7. Specifically, the average value of n of Formula 7 may be 40 to 10,000.

Specifically, the repeating unit n may include olefin repeating subunits p and 1-p. In the specification, p and 1-p are used as symbols distinguishing olefin repeating units constituting the repeating unit n, and also indicate respective mole fractions of repeating subunits present in the repeating unit n. Compositions of the repeating subunits (p and 1-p) in the polyolefin chain may be controlled by adjusting an amount of the olefin monomer input in olefin polymerization (chain transfer polymerization) according to a preparation method to be described below. The compositions of the repeating subunits (p and 1-p) may be controlled to be random, gradient or block in the polyolefin chain formed by changing the olefin monomer-input composition during the reaction.

Specifically, the hydrocarbyl may be substituted or unsubstituted, and when the hydrocarbyl is substituted, a substituent may be, for example, a hydrocarbyl group having 1 to 5 carbon atoms, such as methyl, ethyl, propyl, butyl, pentyl or an isomer thereof, but the present invention is not particularly limited thereto. In addition, the hydrocarbyl may be a cyclic, acyclic, branched or straight-chained type.

More specifically, the hydrocarbyl having 1 to 20 carbon atoms includes an alkyl having 1 to 20, an alkenyl having 2 to 20 carbon atoms or an alkynyl having 2 to 20 carbon atoms, and even more specifically, an alkyl having 1 to 10 carbon atoms, such as methyl, ethyl, propyl, butyl, pentyl, hexyl, heptyl, octyl, nonyl, decanyl, or an isomer thereof.

Specifically, z may be, but is not particularly limited to, an integer of 0 to 10. Although a composition in which the value of z is an integer of 10 or more can be used, since a benefit obtained using such a large molecule is small, the value of z is limited to a predetermined integer of 0 to 10 in the present invention. In this range, in the case of the preparation method, the effect of increasing efficiency and precisely controlling a reaction may be further improved. The z may be, for example, 0 to 8, 0 to 6, 0 to 4, 0, 1, 2, 3 or 4. In this range, it is easy to supply a reactant required for the preparation of a polynuclear zinc compound.

In an exemplary embodiment, in Formula 7, Ar may be phenyl; the average value of m may be 20 to 200; Y is hydrogen; Y' may be methyl, ethyl, butyl or hexyl; either $R^2$ or $R^3$ may be hydrogen; and z may be 0 or 2. In this case, there is no carbon-carbon double bond in the polyolefin block, and an industrially more useful polystyrene-block-polyolefin-block-polystyrene tri-block copolymer may be provided.

The polystyrene-polyolefin-polystyrene tri-block copolymer may have a PDI of 1.2 to 1.5. In this case, the polystyrene-polyolefin-polystyrene tri-block copolymer has no carbon-carbon double bond in the polyolefin block, thereby providing an industrially more useful one distinguished from a polystyrene-block-polyolefin-block-polystyrene tri-block copolymer which is prepared by two processes of conventional anionic polymerization and hydrogenation to have a PDI of 1.2 or less.

The tri-block copolymer represented by Formula 7 may be, for example, a tri-block copolymer such as a polystyrene-block-poly(ethylene-co-propylene)-block-polystyrene, a polystyrene-block-poly(ethylene-co-1-butene)-block-polystyrene, a polystyrene-block-poly(ethylene-co-1-hexene)-block-polystyrene, or a polystyrene-block-poly(ethylene-co-1-octene)-block-polystyrene.

Yet another exemplary embodiment of the present invention provides a method for preparing a polystyrene-polyolefin-polystyrene tri-block copolymer, which includes: forming a polyolefin block by chain transfer polymerization of an olefin-based monomer using a polynuclear zinc compound as a chain transfer agent; and forming a polystyrene block by sequentially inputting an silicon atom-containing alkyl lithium compound, a triamine compound and a styrene-based monomer and performing anionic polymerization.

Therefore, the preparation method exhibiting excellent selectivity to a polystyrene-polyolefin-polystyrene tri-block copolymer may be provided by stably forming a polyolefin block having a desired structure, and stably forming a polystyrene block at both ends of the formed polyolefin structure.

In addition, it is possible to provide a one-pot preparation method for directly preparing the polystyrene-polyolefin-polystyrene tri-block copolymer from an olefin monomer and a styrene monomer, and a method for preparing a polystyrene-polyolefin-polystyrene tri-block copolymer suitable for realizing a thermoplastic elastomer physical property by inhibiting the generation of di-block and homopolymers may be provided.

Method for Preparing Polystyrene-Polyolefin-Polystyrene Tri-Block Copolymer

<Step of Forming Polyolefin Block>

First, in the step of forming a polyolefin block, a polyolefin block constituting a polystyrene-polyolefin-polystyrene tri-block copolymer may be formed through chain transfer polymerization of an olefin-based monomer using a polynuclear zinc compound as a chain transfer agent.

Specifically, the polynuclear zinc compound is an organozinc compound having an alkanediyl group, and more specifically, a compound represented by Formula 8 below.

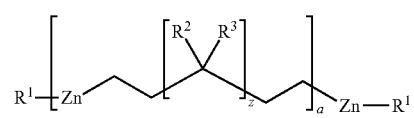

[Formula 8]

In Formula 8, $R^1$ is a hydrocarbyl having 1 to 20 carbon atoms; $R^2$ and $R^3$ are each independently hydrogen or a hydrocarbyl having 1 to 20 carbon atoms; z is an integer of 0 to 10; and the average value of a is 1 to 10.

The hydrocarbyl may be substituted or unsubstituted, and when the hydrocarbyl is substituted, a substituent may be, for example, a hydrocarbyl group having 1 to 5 carbon atoms, for example, methyl, ethyl, propyl, butyl, pentyl or an isomer thereof, but the present invention is not particularly limited thereto. In addition, the hydrocarbyl used as the substituent may be a cyclic, acyclic, branched or straight-chained type.

The hydrocarbyl having 1 to 20 carbon atoms is specifically an alkyl having 1 to 20 carbon atoms, an alkenyl having 2 to 20 carbon atoms or an alkynyl having 2 to 20 carbon atoms, and more specifically, an alkyl having 1 to 10 carbon atoms, such as methyl, ethyl, propyl, butyl, pentyl, hexyl, heptyl, octyl, nonyl, decanyl, or an isomer thereof.

In Formula 8, z may be specifically an integer of 0 to 10, but the present invention is not particularly limited thereto. Although a polynuclear zinc compound in which the value of z is an integer of 10 or more can be used, since a benefit obtained using such a large molecule is small, the value of z is limited to a predetermined integer of 0 to 10 in the present invention. The z may be, for example, 0 to 8, 0 to 6, 0 to 4, 0, 1, 2, 3, or 4. In this range, it is easy to supply a reactant required for the preparation of a polynuclear zinc compound.

In Formula 8, while a is a natural number of more than 0, but the present invention is not particularly limited, the polynuclear zinc compound represented by Formula 8 is a mixture in which the value of a has a predetermined distribution, rather than a single integer, and is, for example, an average value of 1 to 10. In Formula 8, when the average value of a is more than 10, the molecular weight of the polynuclear zinc compound generated upon application to olefin polymerization is excessively large, and thus viscosity is increased. As a result, reaction control may be difficult.

In an exemplary embodiment, the polynuclear compound may be a compound represented by Formula 8-1 or Formula 8-2 below. The compound represented by Formula 8-1 or 8-2 is advantageous because it can be prepared using $Et_2Zn$ or $Me_2Zn$, which is commercially produced and used in a large quantity, as a raw material.

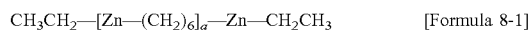
[Formula 8-1]

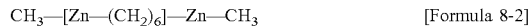
[Formula 8-2]

In Formulas 8-1 and 8-2, the average value of a is 1 to 10.

The olefin monomer input as a reaction material in the step of forming a polyolefin block in the present invention may be, but not particularly limited to, specifically, an olefin having 2 to 10 carbon atoms, more specifically, an alpha olefin having 2 to 10 carbon atoms, such as ethylene, propylene, 1-butene, 1-hexene, 1-octene or 1-decene.

In an exemplary embodiment, when ethylene, propylene or 1-butene, which has a relatively low boiling point, is used as the olefin monomer, polymerization may proceed under a constant pressure.

In the step of forming a polyolefin block of the present invention, a transition metal catalyst for olefin polymerization may be used for chain transfer polymerization. While there is no specific limit to the type of a transition metal catalyst, conventionally, a homogeneous (metallocene) catalyst, which includes a transition metal catalyst as a main catalyst and/or an organoaluminum or boron compound as a cocatalyst, or a heterogeneous Ziegler catalyst may be used. In an exemplary embodiment, a homogeneous catalyst is preferable due to more excellent catalytic activity.

Specifically, the transition metal catalyst may include the above-described compound represented by Formula 5 or 6. The description of the transition metal catalyst is the same as described above.

The step of forming a polyolefin block may be performed, for example, in a homogenous solution state. Here, a hydrocarbon solvent may be used as a solvent, or an olefin monomer itself may be used as a medium. An example of the hydrocarbon solvent may be an aliphatic hydrocarbon solvent having 4 to 20 carbon atoms, specifically, isobutane, hexane, cyclohexane or methylcyclohexane, which may be used alone or in combination of two or more thereof.

A polymerization temperature in the step of forming a polyolefin block may be changed according to a reaction material, a reaction condition, etc., and may be specifically 40 to 170° C., and more specifically, 95 to 125° C. In this range, the solubility of a polymer may be increased, and the catalyst may be thermally stabilized.

The olefin polymerization in the step of forming a polyolefin block may be performed batchwise, semi-continuously or continuously, or performed in two or more steps with different reaction conditions.

While not particularly limited, the polynuclear zinc compound represented by Formula 8 may be prepared by a method of performing hydroboration through a reaction between a diene compound and a boron-based inorganic compound, and performing an alkyl exchange reaction through a reaction between the resulting product and a dialkylzinc compound.

More specifically, a method for preparing the polynuclear zinc compound represented by Formula 8 may be carried out by a method shown in Reaction Scheme 3 below.

[Reaction Scheme 3]

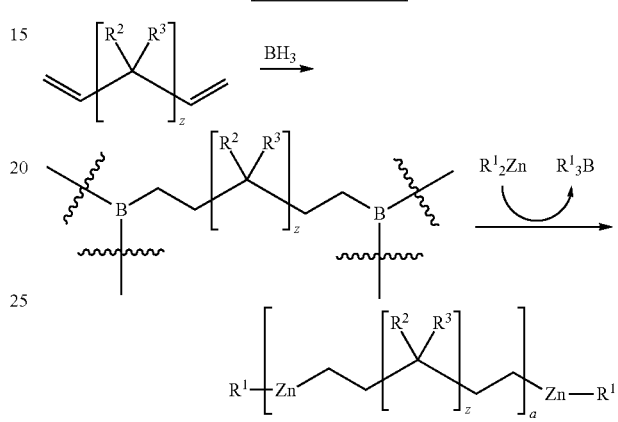

In Reaction Scheme 3, a diene compound, which is a starting material, may be variously selected according to a desired structure of $R^2$ or $R^3$ and a z value of Formula 8. In Reaction Scheme 3, the z value is derived from the structure of the diene compound, which is the starting material, and may determine the z value of Formula 8. In Reaction Scheme 3, a compound in which z has an integer of 10 or more may be used, but when the z value is limited to a certain integer of 0 to 10, more excellent structural uniformity of the polynuclear zinc compound of Formula 8 is obtained, and the supply of a raw material is facilitated.

In Reaction Scheme 3, the diene compound is specifically a diene compound having a z value of 0 to 10, for example, 1,3-butadiene, 1,5-hexadiene, 1,7-octadiene, 1,9-decadiene, or isoprene.

In an exemplary embodiment, when 1,3-butadiene or 1,5-hexadiene (a compound in which either $R^2$ or $R^3$ is hydrogen and z is 0 or 2) is used as a starting material of Reaction Scheme 3, due to low costs and bulk purchase of the raw material, the use of 1,3-butadiene or 1,5-hexadiene is advantageous in economical and industrial aspects.

In Reaction Scheme 3, while a boron-based inorganic compound is not particularly limited as long as it can cause hydroboration of a diene compound, the boron-based inorganic compound is specifically trihydridoboron. In this case, more excellent structural uniformity of the prepared polynuclear zinc compound of Formula 8 may be exhibited, and productivity may be further improved.

In Reaction Scheme 3, the trialkylboron ($R^1{}_3B$) compound temporarily generated by an alkyl exchange reaction between boron and zinc after a dialkyl zinc ($R^1{}_2Zn$) compound is reacted with a product generated after hydroboration may be continuously removed through distillation (or vacuum distillation), thereby synthesizing the compound of Formula 8.

In Reaction Scheme 3, as the alkyl exchange reaction occurs between zinc and boron, and rapidly proceeds between zinc and another zinc, a polynuclear zinc compound prepared by the above-described reaction scheme may be prepared as a mixture in which the value of a in Formula 8 has a constant distribution, rather than a single type of compound.

In addition, the average value of a in Formula 8 may be adjusted by adjusting an amount of the dialkylzinc ($R^1_2Zn$) compound input in Reaction Scheme 3. The average value of a in Formula 8 is determined by a final amount of remaining dialkylzinc ($R^1_2Zn$) compound after the reaction.

In the dialkylzinc ($R^1_2Zn$) input in Reaction Scheme 3, $R^1$ is a hydrocarbyl having 1 to 20 carbon atoms, or a hydrocarbyl having 1 to 20 carbon atoms, in which at least one carbon atom is substituted with a silicon atom, but the present invention is not particularly limited thereto.

In an exemplary embodiment, when $Me_2Zn$ or $Et_2Zn$ is used as the dialkylzinc ($R^1_2Zn$) in Reaction Scheme 3, it is mass-produced in industry, and the supply of a raw material is facilitated. Particularly, when $Me_2Zn$ is used, the boiling point of $Me_3B$ generated as a by-product is −20° C. and thus the by-product is easily removed. When $Et_2Zn$ is used, since the boiling point of $Et_3B$ generated as a by-product is 95° C. and the boiling point of $Et_2Zn$ is 117° C., $Et_3B$ may be selectively removed by distillation or vacuum distillation, which is more advantageous for the process of preparing the compound of Formula 8.

Since an organometallic catalyst and a cocatalyst consisting of an aluminum or boron element, which are used in the preparation, are easily removed, and impurities such as THF and a large amount of magnesium salt are not included, the polynuclear zinc compound of Formula 8 prepared by the above-described method can be provided with a high purity, and therefore, it can be used as a chain transfer agent, and is advantageous for use in olefin polymerization.

While not specifically limited, an example of specific polymerization conditions for olefin polymerization for preparing the polynuclear zinc compound including a polyolefin chain is shown as follows.

<Step of Forming Polystyrene Block>

A polystyrene-polyolefin-polystyrene tri-block copolymer may be prepared by forming a polystyrene block by sequentially inputting an alkyl lithium compound, a triamine compound and a styrene-based monomer in the above-described step of forming a polyolefin block and performing anionic polymerization.

In the step of forming a polystyrene block, a styrene-based monomer may be sequentially inserted into the zinc-carbon bond in the compound of Formula 8, in which the polyolefin block is formed in the above-described step of forming a polyolefin block. In addition, the tri-block copolymer generated by the above-described process may be easily quenched by reacting an end group with water, oxygen or an organic acid, resulting in conversion to an industrially useful polystyrene-polyolefin-polystyrene tri-block copolymer.

Specifically, the styrene-based monomer may have an alpha styrene-based monomer ($ArCH=CH_2$) having 6 to 20 carbon atoms. More specifically, the styrene-based monomer may be a styrene-based monomer such as ethylene substituted with an aryl group having 6 to 20 carbon atoms, ethylene substituted with a phenyl group, etc., for example, styrene.

In the step of forming a polystyrene block according to the present invention, anionic polymerization is performed by sequentially inputting a silicon atom-containing alkyl lithium compound, a triamine compound and a styrene-based monomer in the step of forming a polyolefin block, such that the styrene-based monomer is inserted into the zinc-carbon bond of $(polyolefinyl)_2Zn$ formed in the step of forming a polyolefin block, and thereby the above-described tri-block copolymer represented by Formula 7 is obtained. Such a reaction may be illustrated by Reaction Scheme 4 below.

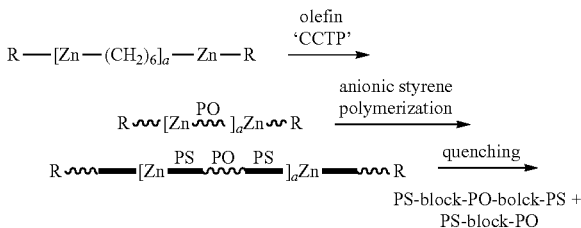

[Reaction Scheme 4]

Specifically, the silicon atom-containing alkyl lithium compound may be the above-described compound represented by Formula 3. Formula 3 is the same as described above.

The alkyl lithium compound is easily obtained or prepared, and thus can be easily applied to the present invention.

Specifically, the triamine compound may be the above-described compound represented by Formula 4. Formula 4 is the same as described above.

The inventors have developed and disclosed a method of growing a polystyrene chain from the zinc-carbon bond of an organozinc compound (Patent Document 1 and Non-patent Document 1). In the prior art invention, styrene polymerization was carried out by inputting nBuLi. (TMEDA) (TMEDA; tetramethylethylenediamine) as an initiator. Here, a unique orange color of styryl anions observed at the beginning gradually turned to a yellowish brown color, resulting in an opaque black color, indicating a phenomenon in which anions from which a polymer chain is grown are destroyed, and there is a disadvantage in that the PDI of the prepared polystyrene is slightly wide (Mw/Mn, ~1.5). In addition, the prior art invention has a disadvantage in that, when the molar ratio (i.e., [styrene]/[Zn]) of the input styrene monomer with respect to zinc atoms in the organozinc compound is as small as 500 or less, a polystyrene chain is grown from a part of the Zn—C bonds present in the organozinc compound, rather than from all of the Zn—C bonds. When the polystyrene chain is grown from a part, rather than all, of the Zn—C bonds in the organozinc compound, a polystyrene-polyolefin di-block or a polyolefin homopolymer is generated, thereby inhibiting the realization of a thermoplastic elastomer property.

In the method of preparing a polystyrene-polyolefin-polystyrene tri-block copolymer according to the present invention, it can be confirmed that anionic polymerization is performed by inputting the compounds of Formulas 3 and 4 (e.g., $Me_3SiCH_2Li.(PMDETA)$) as initiators, and thereby a yellow color is maintained without a color change during the polymerization process, showing that anions at the growth point of the polymer chain are alive and not destroyed. Therefore, the PDI of the prepared polystyrene chain may be relatively lowered. In this case, the PDI of the prepared polystyrene-polyolefin-polystyrene tri-block copolymer is specifically 1.2 to 1.5, and more specifically 1.3 (Mw/Mn).

When the compounds of Formulas 3 and 4 are used as initiators, it was confirmed that the polystyrene chain is grown from all of the Zn—C bonds of the input polynuclear zinc compound, and thus it may be also confirmed that the generation of a polystyrene-polyolefin di-block or a polyolefin homopolymer is inhibited, thereby further improving selectivity of the polystyrene-polyolefin-polystyrene tri-block.

In addition, it was confirmed that the polystyrene chain is grown from a part of the $Me_3SiCH_2Li$ input as an initiator, showing that the generation of an undesired polystyrene homopolymer is also partially inhibited (the polystyrene chain grown from the Zn—C bonds is a block copolymer, and the polystyrene chain grown from $Me_3SiCH_2Li$ is an undesired polystyrene homopolymer).

That is, by newly using the compounds of Formulas 3 and 4 (e.g., $Me_3SiCH_2Li \cdot (PMDETA)$) as initiators, production amounts of a PS homopolymer, a PO homopolymer, and a PO-PS di-block copolymer are reduced, and the generation of a PS-PO-PS tri-block copolymer, which is the object of the present invention, is maximized, resulting in proper realization of a thermosetting elastomer property.

Generally, a transition metal catalyst used in the olefin polymerization in the step of forming a polyolefin block does not affect anionic polymerization in the step of forming a polystyrene block, since it is a trace amount compared to the silicon atom-containing alkyl lithium compound input in the step of forming a polystyrene block. Meanwhile, when an organoaluminum-based cocatalyst input in olefin polymerization in the step of forming a polyolefin block is additionally used, the amount of the organoaluminum-based cocatalyst is not negligible, compared with the alkyl lithium compound input in the step of forming a polystyrene block. Generally, the organoaluminum compound forms a complex with the alkyl lithium compound at a 1:1 ratio (Al:Li ratio), and the complex does not initiate anionic polymerization. However, when the Li/Al ratio is 1 or more, the anionic polymerization is initiated, and a styrene chain is grown from all of the input alkyl lithium compound including the alkyl lithium formed a 1:1 complex.

That is, after the step of forming a polyolefin block using the organoaluminum compound as a cocatalyst, when anionic polymerization is performed in the step of forming a polystyrene block, the mole number of the input alkyl lithium compound may be the same or higher than the mole number of aluminum included in the organoaluminum compound input in the step of preparing a polyolefin block. In consideration of a reaction rate, to efficiently grow the polystyrene chain in-between an organo-zinc bond, the mole number (i.e., "Li mole number−Al mole number") of the silicon atom-containing alkyl lithium compound remaining after the reaction with organoaluminum may be 0.2 fold higher than the mole number of the polynuclear zinc compound of Formula 8.

In an exemplary embodiment, the compound of Formula 4 may be input at a molar ratio of 1:0.5 to 1:1.5, for example, 1:1 with respect to the silicon atom-containing alkyl lithium compound of Formula 3.

In another exemplary embodiment, in the step of forming a polystyrene block, the molar ratio ([styrene]/[Zn]) of the input styrene monomer to zinc atoms may be 250 to 1,000, and more specifically 250 to 500.

In still another exemplary embodiment, in the polystyrene-polyolefin-polystyrene tri-block copolymer, the number of the generated polystyrene polymer chain per zinc atom ([PS-chains]/[Zn]) may be 2.0 to 3.0.

Specifically, the silicon atom-containing alkyl lithium compound of Formula 3 and the compound of Formula 4 may be mixed in an aliphatic hydrocarbon solvent before input, or the silicon atom-containing alkyl lithium compound of Formula 3 and the compound of Formula 4 may be sequentially input into a reactor.

A temperature of the anionic polymerization in the step of forming a polystyrene block may vary according to a reaction material, a reaction condition, etc., and may be specifically, 40 to 170° C., and more specifically 100 to 110° C. In the above range, the tri-block copolymer represented by Formula 7 is efficiently generated.

The anionic polymerization in the step of forming a polystyrene block may be performed batchwise, semi-continuously or continuously, or performed in two or more steps under different reaction conditions.

A time for the anionic polymerization in the step of forming a polystyrene block may vary according to a reaction material, a reaction condition, etc., and may be specifically 0.5 to 10 hours, 0.5 to 8 hours, 0.5 to 5 hours, or 0.5 to 2 hours. In this range, the entire amount of the input styrene-based monomer may be converted into a tri-block copolymer.

The present invention is characterized by simplifying the method of preparing a tri-block copolymer and thus lowering production costs to facilitate application to a commercial process through a method including the step of forming a polyolefin block by olefin polymerization and subsequent forming a polystyrene block by styrene anionic polymerization. In addition, according to the present invention, a polystyrene-polyolefin-polystyrene tri-block copolymer may be prepared from styrene and olefin monomers using a one-pot reaction, thereby reducing production costs, and it is suitable for realizing a thermoplastic elastomer property by inhibiting the generation of a di-block and a homopolymer.

EXAMPLES

Hereinafter, configurations and actions of the present invention will be described in further detail with reference to exemplary examples of the present invention. However, these examples are merely provided as preferable examples, and it is to be understood that the present invention is not limited to the following examples by any means.

Preparation Example 1: Preparation of Organozinc Compound Represented by Formula 2-1

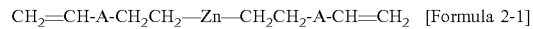

$$CH_2=CH\text{-}A\text{-}CH_2CH_2\text{—}Zn\text{—}CH_2CH_2\text{-}A\text{-}CH=CH_2 \quad \text{[Formula 2-1]}$$

Borane dimethyl sulfide (1.6 mL, 3.2 mmol) was slowly added to triethylborane (0.6 g) while stirring, and then reacted for 90 minutes. The resulting mixture was slowly added to divinylbenzene (3.8 g) dissolved in anhydrous diethyl ether (10 mL) cooled to −20° C., and stirred overnight. The solvent was removed using a vacuum pump, and then diethylzinc (0.8 g) was added. The reaction was allowed to proceed while removing the generated triethylborane through vacuum distillation at 0° C. for 5 hours. At 40° C., the remaining divinylbenzene and diethylzinc were removed through vacuum distillation. The resulting product was dissolved again by adding methylcyclohexane (150 mL), and then a solid compound generated as a by-product was removed by filtration with Celite. The filtrate as is was used in the following Example, and some of the filtrate was taken and subjected to solvent removal and a subsequent $^1H$ NMR analysis. The resulting spectrum is shown in FIG. 1.

Preparation Example 2: Preparation of Polynuclear Zinc Compound Including Organodiyl Group

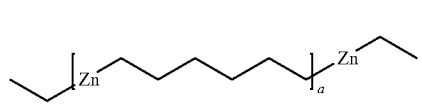

[Formula 8-1]

Sodium borohydride (5.55 g, 146.1 mmol) was input into a two-neck flask in a glove box, and diglyme (73 mL) was input thereinto. 1,5-hexadiene (6.0 g, 73 mmol) was input into another two-neck flask, and then diethylether (17 g) and hexane (24 g) were input thereinto. One opening of the two-neck flask was sealed with a rubber septum, and then a distillation column was connected. Since the reaction is a reaction between diborane gas and 1,5-hexadiene dissolved in a solvent, it is effective when an opening of the distillation column is immersed in a solvent. The connected distillation column was taken out and connected to a Schlenk line. Iodine (18.5 g, 73 mmol) was input into a one-neck flask, and the flask was sealed with a rubber septum. The flask was briefly evacuated for 30 seconds and re-filled with nitrogen to provide a nitrogen atmosphere, and the diglyme (73 mL) from the box was injected using a syringe. The iodine was completely dissolved, and then injected into a two-neck flask containing sodium borohydride for 5 hours. Here, it was determined that all of the double bonds of the 1,5-hexadiene were eliminated by NMR. If the double bonds were not completely eliminated, sodium borohydride was additionally added, and a predetermined quantity of iodine was further added so as to terminate the reaction. Subsequently, the resulting product was reacted with ethylene overnight under 20 bar, thereby obtaining a yellow liquid bis-1,6-(1-boracyloheptyl)hexane. The product obtained and diethylzinc (15.7 g, 127 mmol) were input into the Schlenk flask and then distilled at 0° C. for 4 hours to remove a by-product. Here, the flask receiving the by-product was cooled to −78° C. Since the freezing point of the by-product, triethylboron, is lower than −78° C., and the freezing point of diethylzinc is higher than −78° C., it can be seen that the reaction proceeded in the way that a liquid was generated over time. Afterward, the flask receiving the by-product was cooled with liquid nitrogen for 1 hour, such that the by-product remaining in the distillation column was cooled. The reaction was terminated, the reactor was transferred to the glove box to dissolve hexane and then perform filtration, thereby obtaining a gray liquid. For high purity, the same mass of diethylzinc was added to further perform distillation twice as described above. In the last third distillation, as much volatile material as possible was removed through vacuum distillation until a solid is obtained to increase "a" shown in the compound of Formula 8-1, thereby obtaining a dark gray solid product. Through $^1$H NMR analysis, it was confirmed that the average value of a was 6.5. 0.396 g of diethylzinc was added to 3.0 g of the prepared compound and mixed by heating, thereby obtaining a compound in which the average value of a is 3.

Experimental Example 1: Evaluation of Initiator Performance in Process of Anionic Polymerization Styrene polymerization using a Me$_3$SiCH$_2$Li.(PMDETA) initiator in the presence of a dihexylzinc compound was performed to evaluate the performance of the initiator during the anionic polymerization.

The dihexylzinc compound (22.6 mg, 0.096 mmol), Me$_3$SiCH$_2$Li (6.3 mg, 0.067 mmol, [Li]/[Zn]=0.70), and PMDETA (11.7 mg, 0.067 mmol) were dissolved in methylcyclohexane (27 g) and input into a one-neck flask. The resulting solution was stirred for 15 minutes in a 90° C. water bath, a styrene monomer (5.0 g, 48.0 mmol, [styrene]/[Zn]=500) was added, and then anionic polymerization was performed at 90° C. for 3 hours.

During the polymerization, the initial yellow color of the solution remained unchanged. From the NMR spectrum, it was confirmed that styrene was all converted into polystyrene. Afterward, an organozinc compound including the generated polystyrene and a silicon atom-containing alkyl lithium compound were decomposed by adding a 2N aqueous HCl solution (0.3 mL) and dissolved in toluene, and passed through a silica gel pad, thereby obtaining a pure polystyrene. The mass of the obtained pure polystyrene was the same as the amount of the input styrene monomer. The molecular amount of the obtained polystyrene was measured using gel permeation chromatography, and the number average molecular weight (Mn) was 23,000. The number of the produced polystyrene polymer chains per molecule of the organozinc compound may be calculated from the measured Mn value according to the following Equation 1.

$$[\text{PS-chains}]/[\text{Zn}]=[\text{styrene}]/[\text{Zn}]/\text{DP}(\text{DP}=M_n/104). \quad [\text{Equation 1}]$$

Experimental Examples 2 to 6 and Comparative Experimental Examples 1 and 2: Evaluation of Initiator Performance in Anionic Polymerization The results of an experiment by changing the [styrene]/[Zn] and [Me$_3$SiCH$_2$Li.(PMDETA)]/[Zn] ratios among the experimental conditions and the results of an experiment by inputting [Me$_3$SiCH$_2$Li.(TMEDA)] as a comparative experimental example are shown in Table 1 below. The experiments were performed by the same method as described in Experimental Example 1, except that the conditions for each experiment were changed as shown in Table 1 below.

In addition, the results of Experimental Examples 1 to 6 and Comparative Experimental Examples 1 and 2 were interpreted and are shown in Reaction Scheme 2.

[Reaction Scheme 2]

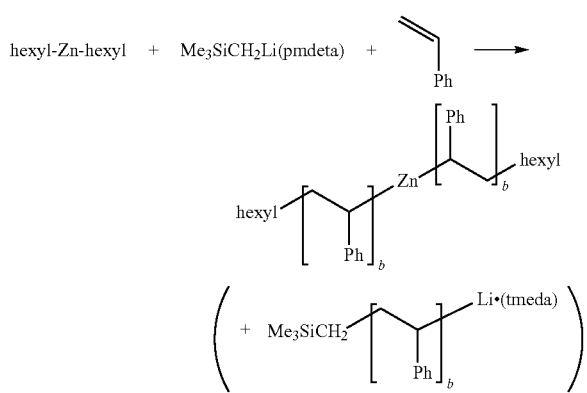

TABLE 1

| Experimental Example | [Styrene]/[Zn] | [Me₃SiCH₂Li•(PMDETA)]/[Zn] | $M_n$ | $M_w/M_n$ | {[PS-chains]-[Li]}/[Zn] |
|---|---|---|---|---|---|
| Experimental Example 1 | 500 | 1.00 | 23200 | 1.24 | 2.24 |
| Experimental Example 2 | 500 | 0.700 | 23000 | 1.23 | 2.26 |
| Experimental Example 3 | 500 | 0.500 | 20800 | 1.26 | 2.50 |
| Experimental Example 4 | 500 | 0.300 | 22000 | 1.30 | 2.36 |
| Experimental Example 5 | 250 | 1.00 | 13200 | 1.31 | 1.97 |
| Experimental Example 6 | 250 | 0.700 | 12500 | 1.36 | 2.08 |
| Comparative Experimental Example 1 | 500 | 1.00 (TMEDA) | 28100 | 1.32 | 1.85 |
| Comparative Experimental Example 2 | 500 | 0.700 (TMEDA) | 31200 | 1.37 | 1.67 |

As seen from the results of Experimental Examples and Comparative Experimental Examples, in the ¹H NMR spectra of the polystyrenes generated in Experimental Examples 1 to 4 in which anionic polymerization was performed while the [styrene]/[Zn] ratio was fixed at 500, and the [Me₃SiCH₂Li.(PMDETA)]/[Zn] ratio was changed to 1.0, 0.70, 0.50 or 0.30, the signal of the Me₃Si—* end group was observed to have a very insignificant size at ~0 ppm. In addition, the [PS-chains]/[Zn] value is in the range of 2.24 to 2.50, showing that polystyrene chains were primarily grown from all Zn—C bonds, and the PS chains were then grown from a part of the Me₃SiCH₂—* moieties. Particularly, the polystyrenes generated in Experimental Examples 1 to 4 also had favorably narrow PDIs (Mw/Mn, 1.23~1.30). In addition, like Experimental Examples 5 and 6, even when the [styrene]/[Zn] ratio is as low as 250, in the ¹H NMR spectra, the signal of the Me₃SiCH₂-end group was not observed, and the [PS-chains]/[Zn] values were 1.97 and 2.08, indicating that the polystyrene chains were grown from all Zn—C bonds, but not grown from the Me₃SiCH₂—* moieties.

On the other hand, in Comparative Experimental Examples 1 and 2 in which [Me₃SiCH₂Li.(TMEDA)], instead of [Me₃SiCH₂Li.(PMDETA)] of Experimental Examples 1 to 6, was input as an initiator, from the ¹H NMR spectra, the signal of the Me₃SiCH₂—* end group was not observed. However, the [PS-chains]/[Zn] value was 1.85 or 1.67, indicating that the polystyrene chain was not grown from a part of the Zn—C bonds.

In addition, when nBuLi.(PMDETA) was used as an initiator, it was confirmed that the nBuLi.(PMDETA) was rapidly decomposed in cyclohexane at a high temperature (90° C.), and thus is not suitable for use as an initiator.

Example 1: Preparation of Multi-Block Copolymer Represented by Formula 1 in which Polystyrene Chains were Attached to Both Ends of Polyolefin

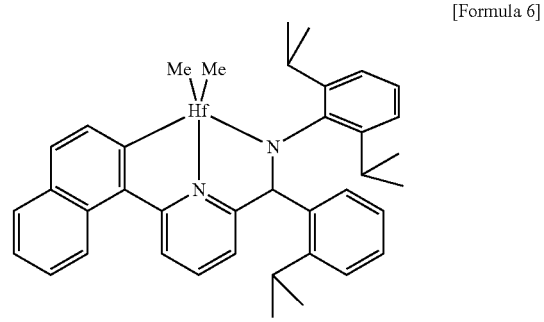

[Formula 6]

A solution of trimethylaluminum (14.4 mg, 200 μmol-Al) dissolved in methylcyclohexane (17 g) was injected into a high-pressure reactor. A catalytic toxin in the high-pressure reactor was removed at 100° C. for 1 hour, and the solution was removed using a cannula.

An organozinc compound represented by Formula 2-1 (49.1 mg, 150 μmol) dissolved in methylcyclohexane (40 g) was input into the high-pressure reactor, and the temperature was increased to 80° C. The compound of Formula 6 and $(C_{18}H_{37})N(Me)H^+[B(C_6F_5)_4]^-$ (4.0 μmol) were dissolved in 1 g benzene and stirred for 2 hours. This solution was then put in 15 g of methylcyclohexane treated with the scavenger trioctylaluminum (50 μmol, 18.3 mg). As soon as a catalyst solution was injected into the high-pressure reactor, an ethylene-propylene mixed gas was injected under 20 bar. Although the reactor was cooled with a fan, due to an exothermal reaction, the temperature was increased up to ~115° C. within 5 minutes. The temperature was gradually decreased, and adjusted in the range of 95 to 115° C. Due to the consumption of the monomer, the pressure was gradually decreased, and a polymerization process was performed at 45° C. for 60 minutes, followed by discharging the remaining gas. In this procedure, the polymer solution expanded to plug the valve, and since the sample in this part did not participate in the second step to be described below, it was analyzed by GPC and ¹H NMR analyses.

Me$_3$SiCH$_2$Li (150 μmol, 14.1 mg) and PMDETA (150 μmol, 26 mg) were mixed in methylcyclohexane (1.0 g), and then injected into the reactor, followed by stirring for 30 minutes. A stirring temperature was maintained between 90° C. and to 100° C. Styrene (7.8 g) was injected into a high-pressure reactor, and the temperature was maintained between 90° C. and 100° C., followed by complete conversion of the styrene monomer through a reaction for 5 hours (confirmed by $^1$H NMR analysis). Following the complete conversion of styrene, acetic acid and ethanol were sequentially injected. The obtained polymer was dehydrated overnight in a vacuum oven at 180° C. After the temperature was lowered to room temperature, the generated block copolymer (2.8 g) was transferred to a flask and stirred with chloroform (30.3 g) for 20 minutes at 75° C. while refluxing, and acetone (60.6 g) was added to precipitate the polymer material. A solvent was removed from a filtrate obtained by filtering the solution containing the polymer material using a vacuum pump, thereby obtaining homopolystyrene (0.49 g). In this extraction procedure, a part of the block copolymers were also eluted with the homopolystyrene, and thus, in GPC analysis result, the PDI showed a wide bimodal curve.

Examples 2 to 8: Preparation of Block Copolymers in which Polystyrene Chains were Attached to Both Ends of Polyolefin Represented by Formula 1

Copolymers were prepared by the same method as described in Example 1, except that polymerization conditions were changed as shown in Table 2 below. The results of preparing the block copolymers of Examples 1 to 8 are summarized in Table 3.

TABLE 2

|  | Catalyst content (μmol) | [(C$_{18}$H$_{37}$)$_2$MeNH]$^+$[B(C$_6$F$_5$)$_4$]$^-$ (equiv) | First step, temperature and time for chain transfer reaction | [Me$_3$SiCH$_2$Li•(PMDETA)] (μmol) | Second step, temperature and time for anionic polymerization |
| --- | --- | --- | --- | --- | --- |
| Example 1 | 4 | 1 | 95-110° C., 55 min | 150 | 90~100° C., 5.0 h |
| Example 2 | 4 | 1 | 95-110° C., 60 min | 150 | 90~100° C., 5.0 h |
| Example 3 | 4 | 1 | 95-110° C., 45 min | 150 | 90~100° C., 5.0 h |
| Example 4 | 4 | 1 | 95-110° C., 40 min | 150 | 90~100° C., 5.0 h |
| Example 5 | 4 | 1 | 95-120° C., 35 min | 150 | 90~100° C., 5.0 h |
| Example 6 | 4 | 1 | 95-110° C., 60 min | 150 | 90~100° C., 5.0 h |
| Example 7 | 4 | 1 | 90-110° C., 60 min | 150 | 90~100° C., 5.0 h |
| Example 8 | 4 | 1 | 90-110° C., 40 min | 150 | 90~100° C., 5.0 h |

TABLE 3

| Example | Yield (g) | [C3]/ ([C2] + [C3]) | (PS, g)/ (yield, g) | (homo-PS, g)/ (PS, g) | homo-PS M$_n$ (kDa); PDI | PO Mn (kDa):PDI expected | PO equiv | PS equiv | Triblock copolymer Mn (kDa); PDI |
| --- | --- | --- | --- | --- | --- | --- | --- | --- | --- |
| 1 | 22.9 | 0.29 | 0.34 | 0.18 | 21; 1.25 | 50 | 50; 1.89 | 79; 1.91 | 106; 1.76 |
| 2 | 20.1 | 0.27 | 0.38 | 0.20 | 17; 1.17 | 41 | 54; 1.92 | 88; 1.95 | 125; 1.72 |
| 3 | 21.3 | 0.22 | 0.37 | 0.17 | 16; 1.20 | 45 | 52; 1.92 | 90; 1.95 | 121; 1.73 |
| 4 | 24.7 | 0.28 | 0.32 | 0.19 | 18; 1.25 | 56 | 50; 1.96 | 80; 2.00 | 110; 1.75 |
| 5 | 24.1 | 0.25 | 0.32 | 0.23 | 18; 1.46 | 54 | 47; 1.87 | 79; 1.88 | 109; 1.69 |
| 6 | 23.9 | 0.22 | 0.33 | 0.24 | 23; 2.01 | 54 | 48; 1.88 | 84; 1.90 | 120; 1.84 |
| 7 | 20.0 | 0.30 | 0.39 | 0.22 | 17; 1.15 | 41 | 51; 1.98 | 80; 2.00 | 134; 1.67 |
| 8 | 18.7 | 0.24 | 0.42 | 0.17 | 15; 1.13 | 36 | 47; 1.89 | 84; 1.92 | 111; 1.71 |

Example 9: Preparation of Polystyrene-Polyolefin-Polystyrene Tri-Block Copolymer A bomb reactor (125 mL) was charged with a trimethyl aluminum (14.4 mg, 200 μmol-Al) solution in methylcyclohexane (17.0 g). The reactor was controlled to 100° C. using a heating mantle, and then the solution was stirred for 1 hour, and removed using a cannula to remove a catalytic toxin.

The reactor was again charged with a solution of the polynuclear zinc compound (Et[Zn(CH$_2$)$_6$]$_3$ZnEt) (21.5 mg, 150 μmol-Zn) prepared in Preparation Example 2 in methylcyclohexane (45.0 g) under an inert atmosphere, and the temperature was set to 70° C. The catalyst stock solution was prepared by reacting a Hf complex of Formula 6 below (18.1 mg, 25.0 μmol) with [(C$_{18}$H$_{37}$)$_2$MeNH]$^+$[B(C$_6$F$_5$)$_4$]$^-$ (30.4 mg, 25.0 μmol) in benzene (4.0 g). The catalyst stock solution (583 mg, 4.0 μmol-Hf complex) was injected into the reactor using a syringe, and a system was immediately charged with an ethylene/propylene mixed gas at a pressure of 20 bar. Although the reactor was cooled with a fan, a temperature was increased up to ~125° C. within 5 minutes due to the exothermic reaction. The temperature was gradually decreased, and adjusted in the range from 95 to 125° C. Due to the consumption of the monomer, the pressure was gradually decreased to 16 bar, and due to the formation of a thick viscous solution, the stirring rate was gradually decreased from 300 rpm to 40 rpm. After performing the polymerization process for 40 minutes, the remaining gas was discharged. In this procedure, the polymer solution expanded to plug the valve and was recovered for GPC and $^1$H NMR analyses. When the temperature reached 90° C., a Me$_3$SiCH$_2$Li.(PMDETA) solution prepared by mixing Me$_3$SiCH$_2$Li (11.3 mg, 0.120 mmol) and PMDETA (20.8 mg, 0.120 mmol) in methylcyclohexane (1.0 g) was added.

The temperature was maintained at 90° C. for 30 minutes while stirring, and then styrene (7.8 g, 750 mmol) was injected. The temperature was controlled in the range of 100 to 110° C. using a mantle. The viscosity was gradually increased almost to the point where stirring was impossible within 5 hours. The complete conversion of styrene was confirmed by $^1$H NMR analysis of an aliquot of the obtained solution. After the complete conversion of the styrene, acetic acid and ethanol were sequentially injected. The obtained polymer mass was dried overnight in a vacuum oven at 160° C. (24.7 g). After dissolving the polymer (3.0 g) in chloroform (30.0 g) at 60° C., acetone (60.0 g) was added to precipitate the block copolymer. The preparation results are shown in Table 5 below.

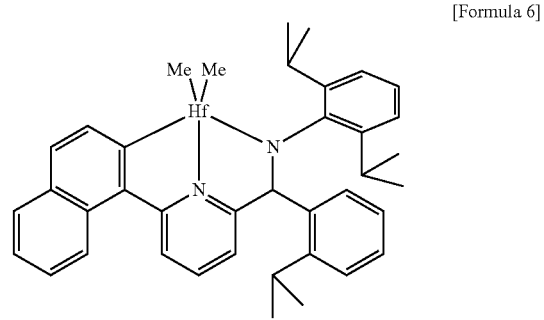

[Formula 6]

Examples 10 to 15: Preparation of Polystyrene-Polyolefin-Polystyrene Tri-Block Copolymers A copolymer was prepared by the same method as described in Example 9, except that reaction conditions were changed as shown in Table 4 below. Preparation results are shown in Table 5 below.

TABLE 4

| | Catalyst content (μmol) | [(C$_{18}$H$_{37}$)$_2$MeNH]$^+$[B(C$_6$F$_5$)$_4$]$^-$ (equiv) | Temperature and time for chain transfer reaction | [Me$_3$SiCH$_2$Li•(PMDETA)] (μmol) | Temperature and time for anionic polymerization |
|---|---|---|---|---|---|
| Example 9 | 3 | 1 | 95-125° C., 40 min | 110 | 100~110° C., 5.0 h |
| Example 10 | 4 | 1 | 95-125° C., 40 min | 120 | 100~110° C., 5.0 h |
| Example 11 | 4 | 1 | 95-125° C., 40 min | 120 | 100~110° C., 5.0 h |
| Example 12 | 3 | 1 | 95-125° C., 40 min | 110 | 100~110° C., 5.0 h |
| Example 13 | 4 | 1 | 95-125° C., 40 min | 120 | 100~110° C., 5.0 h |
| Example 14 | 3 | 1 | 95-125° C., 40 min | 110 | 100~110° C., 5.0 h |
| Example 15 | 4 | 1 | 95-125° C., 40 min | 120 | 100~110° C., 5.0 h |

In addition, the 1H NMR spectrum of the tri-block copolymer prepared in Example 12 is shown in the accompanying FIG. 12.

In addition, the DSC analysis result of the tri-block copolymer prepared in Example 10 is shown in the accompanying FIG. 13.

TABLE 5

| Example | Yield (g) | [C3]/ ([C2] + [C3])$^b$ | (PS, g)/ (yield, g) | (homo-PS, g)/ (PS, g)$^c$ | homo-PS $M_n$ (kDa): PDI$^d$ | PO Mn (kDa):PDI | | Triblock copolymer Mn (kDa): PDI$^e$ |
|---|---|---|---|---|---|---|---|---|
| | | | | | | PO expected$^f$ | PO equiv$^g$ | PS equiv$^e$ | |
| 9 | 17.6 | 0.29 | 0.44 | 0.17 | 20; 1.63 | 52 | 49; 1.61 | 78; 1.62 | 128; 1.37 |
| 10 | 23.0 | 0.29 | 0.34 | 0.15 | 23; 1.76 | 81 | 57; 1.70 | 91; 1.71 | 127; 1.56 |
| 11 | 28.2 | 0.28 | 0.28 | 0.21 | 23; 1.81 | 109 | 61; 1.81 | 96; 1.84 | 129; 1.62 |
| 12 | 20.4 | 0.26 | 0.38 | 0.18 | 20; 1.52 | 67 | 45; 1.90 | 75; 1.92 | 120; 1.64 |
| 13 | 24.7 | 0.27 | 0.32 | 0.20 | 23; 1.78 | 89 | 57; 1.78 | 93; 1.80 | 141; 1.51 |
| 14 | 18.0 | 0.23 | 0.43 | 0.17 | 20; 1.63 | 54 | 43; 1.81 | 74; 1.82 | 130; 1.48 |
| 15 | 20.8 | 0.22 | 0.38 | 0.22 | 22; 1.51 | 69 | 50; 1.81 | 88; 1.83 | 135; 1.58 |

In Table 5, specific details on b, c, d, e, f and g are as follows.

b represents the mole fraction of propylene in POs measured using the $^1$H NMR spectra.

In addition, [C2] represents the mole fraction of ethylene, and [C3] represents the mole fraction of propylene.

c represents a value obtained by dividing PS weights extracted with acetone and chloroform (2:1 weight ratio) by a consumed styrene weight.

d represents a value measured by GPC at 40° C. eluting with toluene and using PS-standards.

e represents a value measured by GPC at 160° C. eluting with 1,2,4-trichlorobenzene and using PS-standards.

f represents (PO (g))/(Et- and —(CH$_2$)$_6$— units of the chain transfer agent of Formula 8-1 (mol)).

g: represents a value converted to PO equivalents by universal calibration.

Comparative Example 1

Conventional SEBS (Product Name: polystyrene-block-poly(ethylene-ran-butylene)-block-polystyrene), which was produced by preparing SBS and then performing hydrogenation, was purchased from Sigma-Aldrich and used.

<Evaluation Methods>

(1) Universal Calibration of GPC Data

In the case of a PE sample, PS standard molecular weights ($M_{PS}$) were converted to PE equivalents ($M_{PE}$) using the previously known Mark-Houwink-Sakurada parameters for PS (K=0.000121; a=0.707) and PE (K=0.000406; a=0.725) according to Equation 1 below.

$$M_{PE}=[(0.000121/0.000406)\times M_{PS}^{(1+0.707)}]^{(1/(0.725+1))}=0.495\times M_{PS}^{0.990}$$ [Equation 1]

In the case of a poly(ethylene-co-propylene) sample, the converted $M_{PE}$ was further converted to PO equivalents using Equation 2 below.

$$M_{PO}=M_{PE}/(1-S)$$ [Equation 2]

In Equation 2, S is the CH$_3$-side chain (i.e., S=(15×F$_{C3}$)/[(1–F$_{C3}$) 28+(F$_{C3}$ 42)]), wherein F$_{C3}$ is the propylene mole fraction in the poly(ethylene-co-propylene) sample.

(2) Transmission Electron Microscopy (TEM)

Sample preparation: The polyolefin-polystyrene multi-block copolymer (5 mg) in each of the Examples and Comparative Examples was completely dissolved in toluene (5 mL) at 100° C. A drop of the hot solution was loaded onto a carbon-coated copper TEM grid (200 mesh). After slow evaporation of the solvent at room temperature overnight, the sample on the grid was annealed in an oven at 150° C. for 6 hours. The sample was stained with RuO$_4$ by suspending a film-coated TEM grid for 30 minutes in a closed chamber containing an aqueous solution of RuO$_4$ prepared by reacting RuO$_2$ (30 mg) with NaIO$_4$(0.20 g) in water (5 mL) at 0° C. for 4 hours.

(3) Tensile Tests

The polyolefin-polystyrene multi-block copolymer samples in the Examples and Comparative Examples were compressed between two hot plates at 135° C. and under a pressure of 5 MPa for 20 minutes, followed by compression under 10 MPa for 100 minutes. The obtained polymer films with a thickness of 1 mm were cut into four pieces (100×10 mm$^2$ size). Tensile tests were performed twice for each batch according to ASTM D882 using a UTM (WL2100) at a drawing rate of 500 mm/min with a gauge length of 50 mm at 25(±2) ° C. and 45(±5)% humidity. Each specimen was elongated over at least 10 cycles to half of the distance of the breakage length measured in the tensile test.

<Evaluation Results>

(1) GPC Data

FIG. 2 shows the result of GPC analysis for the multi-block copolymer prepared in Example 5. a represents the PDI for a sample obtained after olefin polymerization in the first step, and b represents the PDI for a block copolymer obtained after anionic polymerization in the second step. After anionic polymerization, the number average molecular weight was increased by 30,000 Da. In the anionic polymerization, the growth point of the polystyrene chain is a total of 450 μmol (the mole number of the input anionic polymerization initiator Me$_3$SiCH$_2$Li+the mole number of zinc× 2), and thus it can be expected that the polystyrene chain with a size of 17000 Da (7.8 g/450 μmol) will be grown from one growth point. After the anionic polymerization, the 30,000 Da-increase in number average molecular weight implies that polystyrene chains are attached to both end groups of a polyolefin chain. Also in other Examples besides Example 5, after the anionic polymerization, the number average molecular weights were increased by 33,000, 36,000, 31,000, 29,000, 36,000, 63,000 and 24,000, indicating that the polystyrene chains are attached to both end groups of the polyolefin.

In addition, the GPC analysis result for the tri-block copolymer prepared in Example 9 is shown in the accompanying FIG. 8.

As seen from the result, in Example 9, after the step of forming a polystyrene block by anionic polymerization, the GPC curve showed a distinct overall change in which molecular weights (both Mn and Mw) are increased by 50 kDa after anionic styrene polymerization which is about two fold the homo-PS Mn (20 kDa).

(2) Transmission Electron Microscopy (TEM)

FIGS. 3, 4, 5 and 6 show the transmission electron microscope images of the polyolefin-polystyrene multi-block copolymers prepared in Example 3(a), Example 4(b), Example 5(c) and Example 8(d), respectively.

Since the PS chain is not mixed with the PO chain, phase separation occurs, and the PS domain selectively stained with $RuO_4$ can be clearly identified as a dark area in the TEM image for a thin film. From FIGS. 3 to 6, it can be confirmed that, as the PS domain is uniformly shown and the PS contents are increased to 32 wt %, 37 wt % and 42 wt %, the pattern of the PS domain is changed from a spherical form to a small wave form.

FIG. 9 is a set of transmission electron microscope images of tri-block copolymers prepared in Example 9(e), Example 11(a), Example 12(c), Example 13(b), Example 15(d) and Comparative Example 1(f) of the present invention.

Since the PS chain is not mixed with the PO chain, phase separation occurs, and the PS domain selectively stained with $RuO_4$ can be clearly identified as a dark area in the TEM images for a thin film. Through the morphological change of FIG. 9, the PS contents were increased from 28 wt % to 32 wt %, 38 wt % and 44 wt %, confirming that the pattern of the PS domain is changed from the spherical form to the small wave form.

However, it can be confirmed that the patterns of Examples 9, 11, 12 and 13 are similar, but have a difference in regularity, compared with FIG. 9(f) showing the image of SEBS (Comparative Example 1) prepared through the hydrogenation of conventional SBS having a narrow PDI.

In addition, although Example 15(d) in which the PO chain has a low propylene fraction ($F_{C3}$, 0.22) has a high PS content, that is, 38 wt %, due to crystallinity, it can be confirmed that the pattern of the PS domain is continuously maintained in a spherical form.

(3) Results of Tensile Test

TABLE 6

| Example | $F_{C3}$ | PS (%) | $M_n$ (kDa); PDI | Tensile strength test Tensile strength (N/mm²) | Elongation (%) | Repeated tensile Strength test Elastic recovery at 1st cycle % | Elastic recovery at 10th cycle % |
|---|---|---|---|---|---|---|---|
| 2 | 0.27 | 38 | 125; 1.72 | 4.25 | 486 | 78 | 66 |
| 3 | 0.22 | 37 | 121; 1.73 | 5.09 | 486 | 65 | 55 |
| 5 | 0.25 | 32 | 109; 1.69 | 5.22 | 765 | 77 | 64 |
| 8 | 0.24 | 42 | 111; 1.71 | 6.10 | 469 | 61 | 54 |
| Comparative Example 1 | SEBS | — | — | 19.2 | 723 | 89 | 86 |

Table 6 shows the results of tensile tests and repeated tensile tests for the polyolefin-polystyrene block copolymers prepared in Examples 2, 3, 5 and 8. From the results, it can be seen that a low propylene fraction ($F_{C3}$, 0.22) increases a tensile strength, and a low PS weight percent (32 wt %) increases an elongation rate.

FIGS. 7(a), (b), (c) and (d) show the comparison of the results of repeated tensile tests of Comparative Example 1, which is conventional SEBS, with the repeated tensile test results of the block copolymers prepared in Example 2(a), Example 3(b), Example 5(c), and Example 8(d), confirming that the prepared multi-block copolymers exhibited a thermosetting elastomer property.

TABLE 7

| | $F_{C3}$ | PS (%) | $M_n$ (kDa); PDI | Tensile test Tensile strength (N/mm²) | Elongation (%) | Repeated tensile test Elastic recovery at 1st cycle % | Elastic recovery at 10th cycle % |
|---|---|---|---|---|---|---|---|
| Example 9 | 0.29 | 44 | 128; 1.37 | 9.72 (8.37) | 889 (843) | 63 (63) | 56 (58) |
| Example 10 | 0.29 | 34 | 127; 1.56 | 2.49 (2.33) | 609 (595) | 84 (84) | 71 (73) |

TABLE 7-continued

| | $F_{C3}$ | PS (%) | $M_n$ (kDa); PDI | Tensile test Tensile strength (N/mm$^2$) | Elongation (%) | Repeated tensile test Elastic recovery at 1st cycle % | Elastic recovery at 10th cycle % |
|---|---|---|---|---|---|---|---|
| Example 12 | 0.26 | 38 | 120; 1.64 | 6.94 (4.15) | 785 (512) | 75 (78) | 71 (73) |
| Example 15 | 0.22 | 38 | 135; 1.58 | 9.56 (8.50) | 900 (837) | 58 (57) | 43 (46) |
| Comparative Example 1 | SEBS | — | — | 19.2 (14.8) | 723 (739) | 89 (88) | 86 (86) |

FIG. 10 is a graph showing a stress measurement result of the results of tensile test shown in Table 7. It was confirmed that the tri-block copolymers prepared in Examples 9, 10, 12 and 15 have about the same level of stress as conventional SEBS which has no or less breakage.

FIG. 11 is the result of repeated tensile tests for the tri-block copolymer prepared in Example 12.

FIG. 12 is the result of repeated tensile tests for the tri-block copolymer (conventional SEBS) of Comparative Example 1.

Comparing FIGS. 11 and 12, it was confirmed that, different from the conventional SEBS (Comparative Example 1), the tri-block copolymer of Example 12 in the present invention exhibited the thermosetting elastomer property.

It will be understood by those of ordinary skill in the art that simple modifications or changes of the present invention may be easily performed, and both of the modifications and changes are included in the scope of the present invention.

The invention claiemd is:

1. A polyolefin-polystyrene multi-block copolymer comprising a repeating unit represented by Formula 1 below:

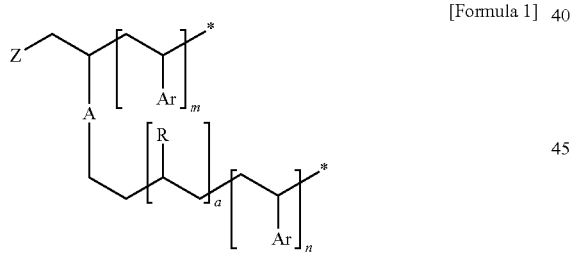

[Formula 1]

wherein, in Formula 1, Ar is a substituted or unsubstituted aryl group having 6 to 20 carbon atoms; n is 0 or has an average value of 10 to 1,000; m has an average value of 0 to 1,000; A is a substituted or unsubstituted meta- or para-phenylene group; R is hydrogen, a methyl group, an ethyl group, a butyl group or a hexyl group; a has an average value of 10 to 10,000; * is each independently the end of the repeating unit or a site connected with a Z moiety by covalent bonding; and Z is a binding site derived from an anionic polymerization initiator and connected with a silicon atom-containing alkyl group having 1 to 20 carbon atoms, a silicon atom-free alkyl group having 1 to 20 carbon atoms, a silicon atom-containing arylalkyl group having 7 to 20 carbon atoms, a silicon atom-free arylalkyl group having 7 to 20 carbon atoms, or the * by covalent bonding.

2. The polyolefin-polystyrene multi-block copolymer of claim 1, wherein, in Formula 1, Z is a binding site derived from an anionic polymerization initiator and connected with a silicon atom-containing alkyl group having 1 to 20 carbon atoms, a silicon atom-containing arylalkyl group having 7 to 20 carbon atoms or the * by covalent bonding.

3. The polyolefin-polystyrene multi-block copolymer of claim 1, wherein, in Formula 1, Ar is an unsubstituted phenyl group; A is an unsubstituted meta- or para-phenylene group; and Z is a binding site connected with $(CH_3)_3SiCH_2$— or the * by covalent bonding.

4. An organozinc compound represented by Formula 2 below:

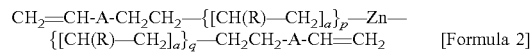

[Formula 2]

wherein, in Formula 2, A is a substituted or unsubstituted meta- or para-phenylene group; a has an average value of 10 to 10,000; R is hydrogen, a methyl group, an ethyl group, a butyl group or a hexyl group; and each of p and q is independently 0 or 1.

5. The organozinc compound of claim 4, which is represented by Formula 2-1 or Formula 2-2 below:

[Formula 2-1]

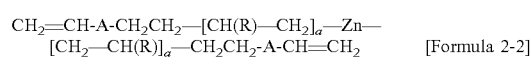

[Formula 2-2]

wherein, in Formulas 2-1 and 2-2, A is a meta- or para-phenylene group, a has an average value of 10 to 10,000; and R is hydrogen, a methyl group an ethyl group, a butyl group or a hexyl group.

6. A method of preparing the polyolefin-polystyrene multi-block copolymer of claim 1, comprising:
a first step of preparing a compound represented by Formula 2-2 below by coordination polymerization of an olefin monomer with a transition metal catalyst in the presence of an organozinc compound represented by Formula 2-1 below; and
a second step of sequentially inputting a silicon atom-containing alkyl lithium compound, a triamine compound and a styrene-based monomer and performing anionic polymerization;

[Formula 2-1]

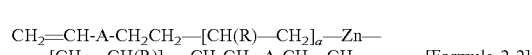

[Formula 2-2]

wherein, in Formulas 2-1 and 2-2, A is a meta- or para-phenylene group; a has an average value of 10 to 10,000; and R is hydrogen, a methyl group, an ethyl group, a butyl group or a hexyl group.

7. The method of claim 6, wherein the silicon atom-containing alkyl lithium compound is represented by Formula 3 below, and the triamine compound is represented by Formula 4 below:

[Formula 3]

[Formula 4]

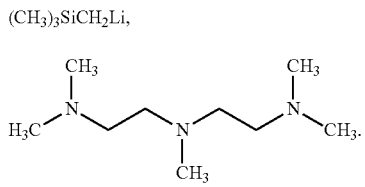

8. The method of claim 6, wherein the olefin monomer is ethylene, propylene, 1-butene, 1-hexene, 1-octene, 1-decene or a mixture thereof, and the styrene-based monomer is styrene.

9. The method of claim 6, wherein the coordination polymerization in the first step is performed by solution polymerization using a solvent including one or more selected from isobutane, hexane, cyclohexane or methylcyclohexane.

10. The method of claim 6, wherein a molar ratio ([Li]/[Zn]) of the silicon atom-containing alkyl lithium compound input in the second step and the organozinc compound represented by Formula 2-1 input in the first step is 0.5 to 2.

11. The method of claim 6, wherein a molar ratio of the triamine compound and the silicon atom-containing alkyl lithium compound input in the second step is 1:0.5 to 1:1.

12. The method of claim 6, wherein a molar ratio ([styrene]/[Zn]) of the styrene-based monomer input in the second step and a zinc atom in the reaction solution is 250 to 1,000.

13. A polystyrene-polyolefin-polystyrene tri-block copolymer represented by Formula 7 below:

[Formula 7]

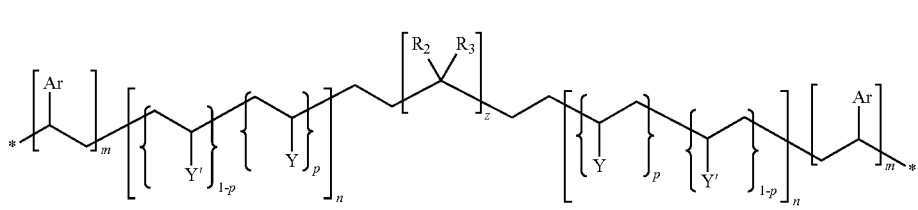

wherein, in Formula 7, Ar is an aryl group having 6 to 20 carbon atoms; m has an average value of 20 to 10,000; Y is hydrogen, methyl, ethyl, butyl, hexyl or octyl, Y' is methyl, butyl, or hexyl, and Y and Y' are not the same as each other; p and 1−p are mole fractions of respective repeating subunit constituting repeating unit n, wherein p is 0 to 1; n has an average value of 40 to 10,000; R2 and R3 are each independently hydrogen or a hydrocarbyl having 1 to 20 carbon atoms; and z is an integer of 0 to 10.

14. The polystyrene-polyolefin-polystyrene tri-block copolymer according to claim 13, wherein, in Formula 7, Ar is phenyl; m has an average value of 20 to 200; Y is hydrogen; Y' is methyl, butyl or hexyl; $R^2$ and $R^3$ are hydrogen; and z is 0 or 2.

15. A method of preparing the polystyrene-polyolefin-polystyrene tri-block copolymer represented by Formula 7 below:

[Formula 7]

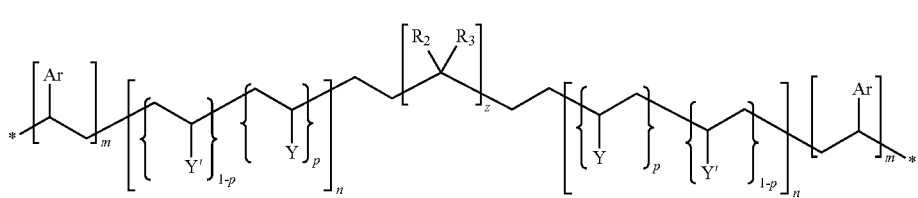

wherein, in Formula 7, Ar is an aryl group having 6 to 20 carbon atoms; m has an average value of 20 to 10,000; Y and Y' are each independently hydrogen, methyl, ethyl, butyl, hexyl or octyl, and Y and Y' are not the same as each other; p and 1-p are mole fractions of respective repeating subunit constituting repeating unit n, wherein p is 0 to 1; n has an average value of 40 to 10,000; R2 and R3 are each independently hydrogen or a hydrocarbyl having 1 to 20 carbon atoms; and z is an integer of 0 to 10, comprising:

forming a polyolefin block by chain transfer polymerization of an olefin monomer using a polynuclear zinc compound as a chain transfer agent; and forming a polystyrene block by inputting a silicon atom-containing alkyl lithium compound, a triamine compound and a styrene-based monomer to the polyolefin block and performing anionic polymerization.

16. The method of claim 15, wherein the polynuclear zinc compound is represented by Formula 8 below:

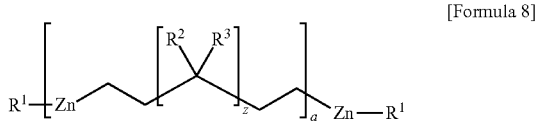

[Formula 8]

wherein, in Formula 8, $R^1$ is hydrocarbyl having 1 to 20 carbon atoms; $R^2$ and $R^3$ are each independently hydrogen or hydrocarbyl having 1 to 20 carbon atoms; z is an integer of 0 to 10; and a has an average value of 1 to 10.

17. The method of claim 15, wherein the polynuclear zinc compound is represented by any one of Formula 8-1 and Formula 8-2 below:

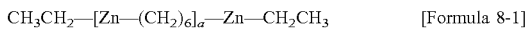   [Formula 8-1]

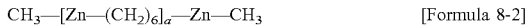   [Formula 8-2]

wherein, in Formulas 8-1 and 8-2, a has an average value of 1 to 10.

18. The method of claim 15, wherein the silicon atom-containing alkyl lithium compound is represented by Formula 3 below, and the triamine compound is represented by Formula 4 below:

   [Formula 3]

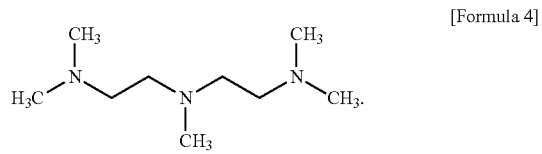   [Formula 4]

19. The method of claim 15, wherein the molar ratio ([styrene]/[Zn]) of the input styrene-based monomer to a zinc atoms in the step of forming the polystyrene block is 250 to 1,000.

20. The method of claim 15, wherein, in the polystyrene-polyolefin-polystyrene tri-block copolymer, the number of generated polystyrene polymer chains per zinc atom ([PS-chains]/[Zn]) is 2.0 to 3.0.

* * * * *